(12) United States Patent
Karlsson et al.

(10) Patent No.: US 11,138,639 B1
(45) Date of Patent: Oct. 5, 2021

(54) SYSTEMS AND METHODS FOR CONTROLLING EFFECTIVE EVENT COSTS IN ONLINE ADVERTISING CAMPAIGNS

(71) Applicant: OATH (AMERICAS) INC., New York, NY (US)

(72) Inventors: Niklas Karlsson, Mountain View, CA (US); Jiaxing Guo, Sunnyvale, CA (US); Qian Sang, Herndon, VA (US)

(73) Assignee: VERIZON MEDIA INC., New York, NY (US)

( * ) Notice: Subject to any disclaimer, the term of this patent is extended or adjusted under 35 U.S.C. 154(b) by 351 days.

(21) Appl. No.: 15/414,257

(22) Filed: Jan. 24, 2017

Related U.S. Application Data

(63) Continuation-in-part of application No. 15/190,055, filed on Jun. 22, 2016, and a continuation-in-part of application No. 15/005,793, filed on Jan. 25, 2016, now Pat. No. 11,074,624.

(60) Provisional application No. 62/183,642, filed on Jun. 23, 2015.

(51) Int. Cl.
*G06Q 30/00* (2012.01)
*G06Q 30/02* (2012.01)

(52) U.S. Cl.
CPC ..... *G06Q 30/0275* (2013.01); *G06Q 30/0277* (2013.01)

(58) Field of Classification Search
CPC .............. G06Q 30/0275; G06Q 30/0277
USPC ..................................................... 705/14.48
See application file for complete search history.

(56) References Cited

U.S. PATENT DOCUMENTS

| | | | | |
|---|---|---|---|---|
| 2004/0088241 | A1* | 5/2004 | Rebane | G06Q 30/08 705/37 |
| 2005/0209953 | A1* | 9/2005 | Stubbs | G06Q 20/10 705/37 |
| 2009/0099902 | A1* | 4/2009 | Chatter | G06Q 30/00 705/14.43 |
| 2016/0379277 | A1 | 12/2016 | Karlsson | |

\* cited by examiner

*Primary Examiner* — Sun M Li
(74) *Attorney, Agent, or Firm* — Cooper Legal Group LLC

(57) ABSTRACT

Embodiments are directed at controlling an online advertising campaign to minimize the effective cost per event or impression. Such embodiments include receiving a desired pacing indicator and a maximum cost indicator. The desired pacing indicator indicates a desired pacing that a user would like to achieve in the campaign. The maximum cost indicator indicates a maximum cost per event or impression the user would like to stay below in the campaign. Embodiments further include monitoring bid transactions of an advertising market of the campaign. Based on monitored bid transactions, an observed pacing measurement and/or an observed cost measurement is determined. Price and allocation control signals are determined based on the desired pacing indicator, the maximum cost indicator, the observed pacing measurement, and the observed cost measurement. The control signals are utilized to adjust a bid price and/or a bid allocation for the campaign.

28 Claims, 10 Drawing Sheets

SYSTEMS AND METHODS FOR CONTROLLING EFFECTIVE EVENT COSTS IN ONLINE ADVERTISING CAMPAIGNS

CROSS REFERENCE TO RELATED APPLICATIONS

This application is a Continuation-In-Part application of and claims priority to, U.S. patent application Ser. No. 15/190,055, filed on Jun. 22, 2016, entitled SYSTEMS AND METHODS FOR CONTROLLING ONLINE ADVERTISING CAMPAIGNS, which claims priority to U.S. Provisional Patent Application No. 62/183,642, filed on Jun. 23, 2015, entitled SYSTEMS AND METHODS FOR CONTROLLING ONLINE ADVERTISING CAMPAIGNS. The entirety of the contents of each of these two applications is incorporated herein by reference. Furthermore, this application is a Continuation-In-Part application of and claims priority to, U.S. patent application Ser. No. 15/005,793, filed on Jan. 25, 2016, entitled ADAPTIVE COST ESTIMATION, the entirety of the contents is incorporated herein by reference.

TECHNICAL FIELD

The present disclosure relates generally to online advertising. More specifically, and without limitation, the present disclosure relates to systems and methods for controlling event costs in an online advertising campaign.

BACKGROUND

Online marketers are interested in placing impressions, such as messages and/or other content, on websites to promote their products or services. At least a portion of the content may be viewed by the user. Influenced by the viewable content, a user may perform a click based on the content or take another action, such as completing an online form to request additional information with regard to the associated product or service. The impression is converted to an action when the user makes a purchase of the product or service. In general, online marketers pay based on, for example, the impressions, clicks, or conversions over the course of a marketing campaign, hereinafter merely referred to as an "online campaign," or simply a "campaign." In some embodiments, the online marketers may pay based on the viewability of the placed impressions.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In accordance with various embodiments of the present disclosure, a computer-implemented method is provided for controlling advertising campaigns. The method includes receiving a desired pacing indicator. The desired pacing indicator indicates a desired pacing that a user would like to achieve for a current portion of the advertising campaign. The method may further include monitoring bid transactions of an advertising market that is associated with the advertising campaign. Based on the monitored bid transaction, at least one of an observed cost measurement or an observed pacing measurement is determined. Control signals are determined based on the desired pacing indicator and the observed pacing measurement. The control signals are utilized to adjust at least one of a bid price or a bid allocation for the advertising campaign.

In accordance with other various embodiments of the present disclosure, one or computer-readable media are provided for storing instructions. The instructions, when executed by a computing device, cause the computing device to a maximum cost indicator and a desired pacing indicator. The maximum cost indicator indicates a maximum cost per event or impression a user would like to stay below for a current portion of an advertising campaign. The method may further include monitoring bid transactions of an advertising market that is associated with the advertising campaign. Based on the monitored bid transactions, an observed cost measurement and an observed pacing measurement are determined. Based on the maximum cost indicator, the observed cost measurement, the desired pacing indicator and the observed pacing measurement, at least one control signal is determined. The control signal is employed to update a bid price and a bid allocation for the advertising campaign.

In accordance with various system erribodiments of the present disclosure, a system is provided for controlling advertising campaigns. The system may include a cost estimator, a controller, and an actuator. The cost estimator monitors bid transactions of an advertising market associated with the advertising campaign. Additionally, the cost estimator may generate an observed cost signal based on the bid transactions. The controller receives an observed cost signal, an observed pacing signal, a maximum cost indicator and a desired pacing indicator. The controller may determine a price control signal and an allocation control signal based the desired pacing indicator, the maximum cost indicator, the observed pacing signal, and the observed cost signal. For instance, the controller may employ at least one of a cost error calculator or a pacing error calculator to determine the control signals, via an adaptive control scheme. The actuator generates, updates, and/or adjusts a bid price signal or a bid allocation signal for the advertising campaign based on the control signals.

This summary is provided to introduce a selection of concepts in a simplified form that are further described below in the Detailed Description of the Embodiments. This summary is not intended to identify key features or essential features of the claimed subject matter, nor is it intended to be used as an aid in determining the scope of the claimed subject matter.

DETAILED DESCRIPTION OF THE EMBODIMENTS

Figure 1:
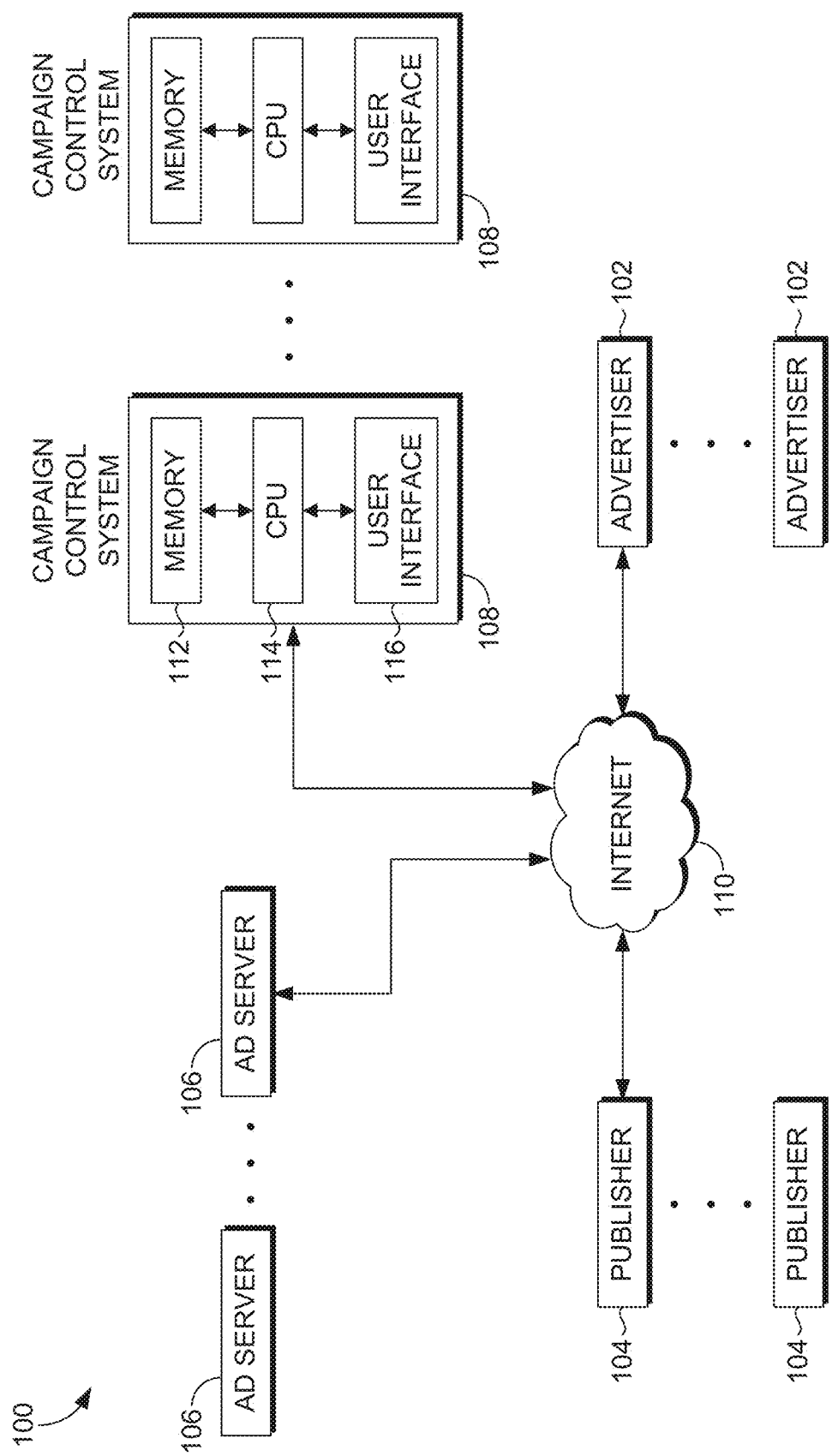
FIG. 1 depicts an illustrative advertising system, in accordance with embodiments of the present disclosure.

Internet "advertisers" and/or "marketers" (hereinafter used interchangeably to refer to a party that pays to provide content via a website or other forum provided via a computer communication network) often create "online campaigns" (or simply "campaigns") that include numerous content, such as advertisements designed to be placed on websites during a specified period of time. For example, a party, such as a marketer or advertiser, may design a "banner ad" or other such content associated with a product or service offered by the company. The party may wish to have the content placed on websites to promote the product or service. Each instance that content is placed on a website may hereinafter be referred to as an "impression." As used herein, and as discussed below, the terms "online market," "marketplace," "market," "advertising networks," or "marketing networks" are used interchangeably to refer to an environment, ecosystem, or platform where advertisers or marketers provide impressions to users.

Furthermore, an advertiser may have a spending plan that specifies how the advertiser wishes to spend a budget that has been allocated for the campaign. For instance, the advertiser may wish to spend money only on certain days, or certain times of day, during the campaign, or may wish to spend evenly over the duration of the campaign. Each advertiser may have a daily budget (e.g., $1,000 per day) and/or a daily goal of impression volume (e.g., 1000 impressions per day), known as "desired daily delivery" or "desired daily pacing." Each advertiser may also desire an ad campaign to perform certain types of consumer targeting (e.g., based on a demographic analysis) and/or achieve a particular distribution of advertisements across various websites ("spreading").

As used herein the terms "segment," "cell," and "unit" are used interchangeably to refer to a defined portion of an online market within which an online campaign is conducted or carried out. Such a segment or cell may be, for example, a website, a group of individuals identified by demographic analysis (e.g., males between the age of 25 and 35 in California), a distinct individual, etc. Thus, provided impressions may be targeted to one or more segments, cells, or units of the online market.

In certain advertising networks, ad servers receive impression requests from publishers (e.g., websites or other entities with an inventory of online ad space). The ad servers may group ad requests from various advertising campaigns, e.g., according to impressions to be "targeted" based on a combination of attributes defined by the ad requests.

In addition to targeting attributes, each ad request received from an advertiser generally includes a "bid price." At least a portion of the ad requests also include a "bid allocation" ("allocation."). The bid price is the amount of money that an advertiser (or party controlling the advertising campaign) offers in association with the ad request for placement of the targeted impression. The bid allocation, if present, is the percentage or ratio (e.g., point value from 0 to 1) of targeted inventory the controlling party of the advertising campaign is willing to purchase at the bid price. The list of ads that target a certain impression request may be sorted in descending order according to their bid price, and then placed in groups such that the sum of their bid allocations equals 1. If the ad request with the highest bid price has a bid allocation of 1, or if there is no restriction on bid allocation, it will win the impression. Such ad delivery methods ensure that the highest bidding advertiser is able to purchase as much inventory as desired. These methods also reveal both the marginal value of the impression inventory (e.g., the cost required per impression), and the amount of volume (e.g., the number or amount of impressions) purchased at each price.

At least a subset of purchased and/or provided impressions may be and/or become associated with one or more "events." More specifically, a particular impression may be and/or become associated with an event or "event type" (the type of event associated with a particular impression) when the particular impression meets one or more event requirements or criteria. Furthermore, such events may be associated with the particular impression, such that the association is bi-directional, i.e. the impression is associated with the event and the event is associated with the impression. Such event requirements or criteria may include, but are not limited to various user interactions with the impression. For instance, a user may select a particular impression, via a "click" event. When the user clicks the particular impression, the particular impression becomes associated with the click event.

Another event type includes an "action" event. For example, when a user takes a particular "action," such as but not limited to completing an online form to request additional information with regard to the product or service associated with a particular impression, the particular impression becomes associated with the action event. Another example includes when the user purchases a product or service associated with a particular impression, the particular impression becomes associated with an action event. The term "conversion" event may be used interchangeably with an action event.

Other event requirements or criteria may be based on properties or characteristics of the provided impression. For instance, an impression may be associated with "viewability," or a "viewable" event if the impression is viewable and/or actually viewed by a user. Such impressions may be "viewable" impressions. In at least one embodiment, a subset of impressions are also events, such as but not limited to a viewable impression, a clicked impression, a converted impression, or the like.

Advertisers may be interested in events and/or impressions. For instance, when trying to increase awareness of a product or service, an advertiser may be interested in viewable impressions. Likewise, when trying to provide more information about a product or service, advertisers are interested in click events. When trying to make sales of a product or service, advertisers are interested in conversion events and/or impressions.

As discussed above in the context of bidding within a campaign, advertisers may pay based on impressions. For instance, an advertiser may pay for each provided impression. In at least one embodiment, over the course of the campaign, advertisers may pay based on whether the impressions are associated with events, such as click events, conversion events, or viewable impressions. Accordingly, the various embodiments are directed to controlling an advertiser effective cost per event or impression, such as but not limited to event types including click events, conversion events, viewable impressions, and the like. More specifically, various embodiments herein are directed towards minimizing, or at least controlling, the advertiser effective cost per event or impression. As a result, various embodiments employ systems and methods that manage or control online ad delivery within and among advertising campaigns by minimizing, or at least controlling the cost per event or impression.

Managing online advertising campaigns is complicated as a result on an unknown and dynamic competitive landscape (the bidding by competing advertising campaigns is unknown). To achieve acceptable budget pacing as well as stability, conventional techniques compromise the optimal return on investment. In particular, conventional techniques do not seek to deliver the impressions at minimum cost per event of interest or impression to the advertiser. Put another way, conventional online advertising campaigns do not seek to optimize performance (e.g., cost per event or impression) in favor of the advertiser. However, as mentioned above and in contrast to conventional campaigns, the various embodiments herein are directed towards to minimizing, or at least controlling the effective cost per event of interest or impression.

As such, the various embodiments include methods and systems that facilitate controlling the cost per event or impression, while subject to various constraints, including pacing and/or maximum cost constraints. At least a portion of the embodiments minimize, or at least control the cost per event (of any event type of interest) or impression, while achieving a pacing that approaches and/or is similar to the desired pacing and not exceeding a maximum cost per event or impression. As used herein, controlling the cost per event or impression may include ensuring that the cost per event or impression is less than or equal to maximum cost constraint, such as but not limited to a maximum cost indicator and/or a maximum cost indicator. Thus, controlling the cost per event or impression may include ensuring an upper bound of the cost per event or impression.

More specifically, the terms "total cost," "pacing," or "revenue" may be used interchangeably to refer to the total cost that a party, such as but not limited to an advertiser and/or marketer deploys for providing impressions in an online campaign. Thus, the total cost or revenue may refer to actual money spent on delivered or provided impressions. The term "total impression count" as used herein, refers to the total amount or volume of impressions that are provided in the campaign. Similarly, the term "total event count" for a particular event type refers to the total number of events (of the particular event type) that are associated with provided impressions. The term "effective cost per event" for a particular event type may refer to the ratio of the total cost (or revenue) to the total number of events (the particular event type). Similarly, the term "effective cost per impression" refers to the ratio of the total cost to the total number of impressions.

As used throughout, "eCPM" stands for the effective cost per one thousand provided impressions. "eCPC" stands for the effective cost per click event, "eCPA" stands for the effective cost per action or conversion event. In various embodiments, "eCPV" stands for the effective cost per thousand viewable impressions. More generally, "eCPX" stands for effective cost of "X," where X may refer to any event type or impression, including but not limited to any of "M," "C," "A," or "V" as used above. It should be understood that in the various embodiments, the event type (or impression type) that "X" represents is not so limited, and the effect cost per a particular event type (or impression) may be used for any event (or impression) type with adequately defined event (or impression) requirements or criteria. In various embodiments, eCPX or an estimate for eCPX may be referred to as an "observed cost," "observed cost measurement," or "cost estimate." In some embodiments, eCPX may be simply references as ($\hat{c}$). As used herein, when referring to the concept of an effective cost per event, where the event type is left unspecified, the term "effective cost per event of interest" may be used, where the event of interest may be of any event type that is currently of interest to a user, such as but not limited to an advertiser. Furthermore, effective cost per event of interest or per impression may be used interchangeably with eCPX.

As used herein, the terms "desired revenue" or "desired pacing" may be used interchangeably to refer to a budget. A desired pacing indicator may include and/or indicate the desired pacing. Likewise, a desired revenue indicator may include and/or otherwise indicate the desired revenue. The desired revenue and/or pacing signals may be reference signals. In various embodiments, the desired pacing or revenue may be expressed as monetary units (e.g., dollars) or as a number of events. For example, if a marketing campaign has a daily budget of $900 and has spent $800 in a given day, the desired pacing for the campaign on that given day is $900 and the observed pacing for the campaign on that given day is $800. Thus, the desired pacing may be indicative of the pacing that a user would like to achieve within a portion of an advertising campaign. In various embodiments, the value of the desired pacing may be encoded or embedded within one or more desired pacing reference signals, referred to as $B^{rev}$.

The terms "max cost threshold" or "max cost" may be used interchangeably to refer to the maximum cost a user (e.g., an advertiser and/or marketer) is willing to pay for an event. A max cost signal may be a max cost reference signal. In embodiments, max cost may represent the maximum average cost the user is willing to pay for each event, the maximum discrete cost the user is willing to pay for each event, or any other suitable cost restriction. Thus, the max cost may be indicative of the maximum cost per event or impression that the user would like to stay below for at least a portion of the advertising campaign. In various embodiments, the value of the max cost may be encoded or embedded within one or more max cost reference signals, referred to as $T^{max}$.

Various embodiments are directed towards managing or controlling an online advertising or marketing campaign by minimizing, or at least controlling "eCPX" for one or more "Xs" or particular interest, subject to one or more constraints. In some embodiments, the effective cost per event of interest or impression is minimized or reduced, while the total cost is less than or equal to the desired pacing (or budget) and eCPX being less than or equal to the max cost. Reference will now be made in detail to illustrative embodiments of the invention, examples of which are illustrated in the accompanying drawings.

Exemplary Advertising System and Environment

FIG. 1 depicts an illustrative advertising system 100, in accordance with embodiments of the present disclosure. As shown in FIG. 1, advertising system 100 may include one or more advertisers 102, publishers 104, ad servers 106, and campaign control systems 108, that are in communication with one another through a network, such as the Internet 110. The number and orientation of the computing components in FIG. 1 is provided for purposes of illustration only. Any other number and orientation of components is possible. For example, one or more of advertisers 102, publishers 104, ad servers 106, and campaign control systems 108 may be combined or co-located and/or communicate directly with one another, instead of over Internet 110. The components of FIG. 1 may include any type or configuration of computers and/or servers, such as, for example, a server cluster, a server farm, load balancing servers, distributed servers, etc. In addition, each component may include one or more processors, memories or other data storage devices (i.e., computer-readable storage media), such as hard drives, NOR or NAND flash memory devices, or Read Only Memory (ROM) devices, etc., communications devices, and/or other types of computing elements.

Advertisers 102 represent computing components associated with entities having online advertisements (e.g., banner ads, pop-ups, etc.) that the entities desire to deliver to online consumers. Advertisers 102 may interact with publishers 104, ad servers 106, and/or campaign control systems 108 through the Internet 110. Thus, advertisers 102 may be able to communicate advertising information, such as ad information, targeting information, consumer information, budget information, bidding information, etc., to other entities in system 100.

Publishers 104 represent computing components associated with entities having inventories of available online advertising space. For example, publishers 104 may include computing components associated with online content providers, search engines, e-mail programs, web-based applications, or any computing component or program having online user traffic. Publishers 104 may interact with advertisers 102, ad servers 106, and/or campaign control systems 108 via the Internet 110. Thus, publishers 104 may be able to communicate inventory information, such as site information, demographic information, cost information, etc., to other computing components in system 100.

Ad servers 106 may include servers or clusters of servers configured to process advertising information from advertisers 102 and/or inventory information from publishers 104, either directly or indirectly. In certain embodiments, ad servers 106 may be remote web servers that receive advertising information from advertisers 102 and serve ads to be placed by publishers 104. Ad servers 106 may be configured to serve ads across various domains of publishers 104, for example, based on advertising information provided by advertisers 102. Ad servers 106 may also be configured to serve ads based on contextual targeting of web sites, search results, and/or user profile information. In some embodiments, ad servers 106 may be configured to serve ads based on control signals generated by campaign control systems 108.

Figure 3A:
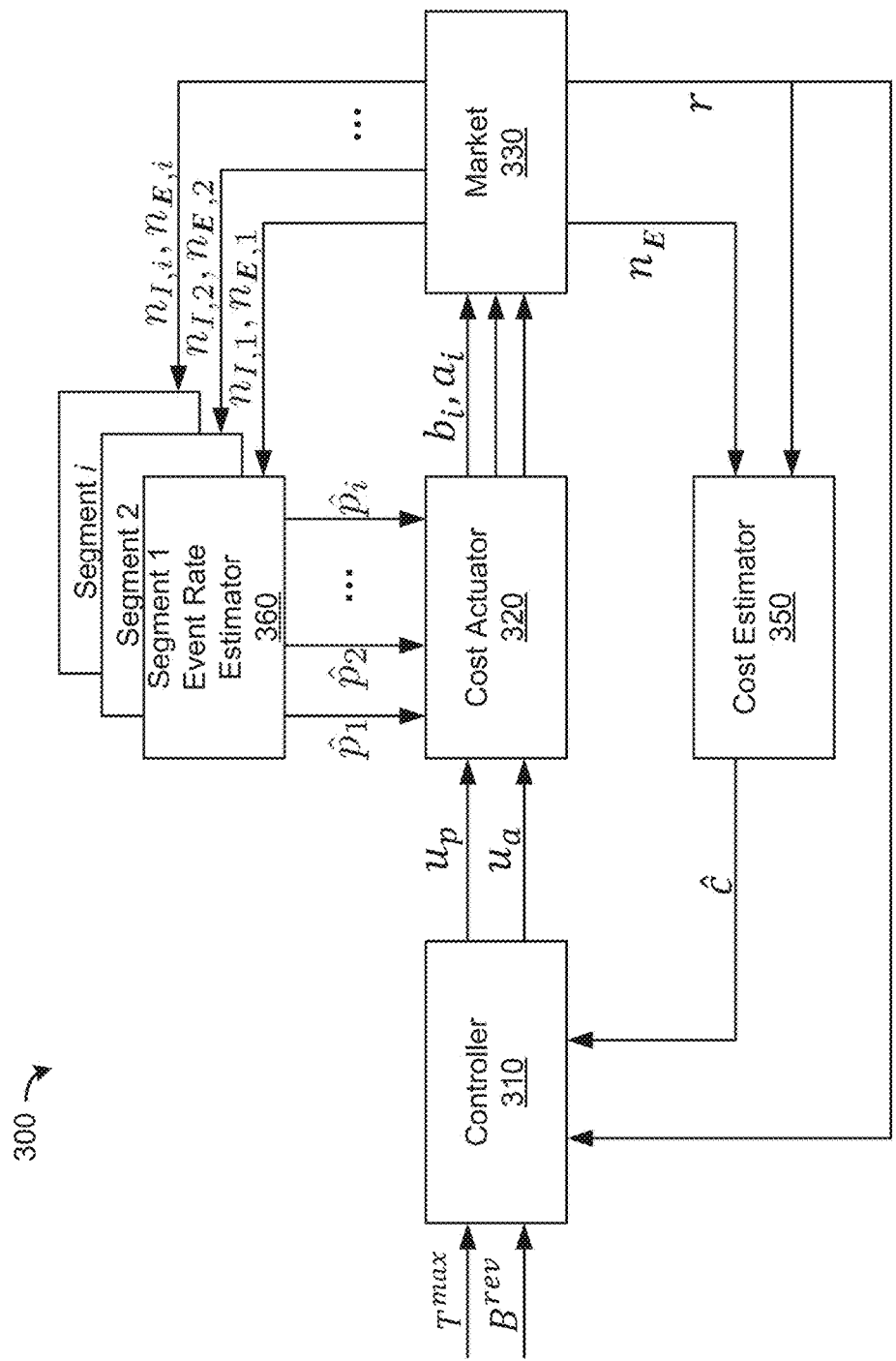
FIG. 3A depicts a block diagram of illustrative campaign control systems for controlling online advertising campaigns, in accordance with various embodiments of the present disclosure.

Various embodiments of campaign control systems, such as but not limited to campaign control systems 108, are discussed in conjunction with at least campaign control system 300 of FIG. 3A. Campaign control systems 108 may include computing systems configured to receive information from computing components in system 100, process the information, and generate advertising control signals to be sent to other computing components in system 100, according to the illustrative methods described herein. Campaign control systems 108 may include any type or combination of computing systems, such as clustered computing machines and/or servers, including virtual computing machines and/or virtual servers. Campaign control systems 108 may include, for example, implementations of Adlearn Open Platforms (AOP) control systems offered by America Online (AOL) of New York, N.Y. In some embodiments, campaign control systems 108 may include an assembly of hardware, including a memory 112, a central processing unit ("CPU"), and/or a user interface 116. Memory 112 may include any type of RAM or ROM embodied in a physical, computer-readable storage medium, such as magnetic storage including floppy disk, hard disk, or magnetic tape; semiconductor storage such as solid state disk (SSD) or flash memory; optical disc storage; or magneto-optical disc storage. CPU 114 may include one or more processors for processing data according to instructions stored in the memory, for example to perform the methods and processes discussed in detail herein. The functions of the processor may be provided by a single dedicated processor or by a plurality of processors. Moreover, the processor may include, without limitation, digital signal processor (DSP) hardware, or any other hardware capable of executing software. User interface 116 may include any type or combination of input/output devices, such as a display monitor, graphical user interface, touchscreen or pad, keyboard, and/or mouse. In other embodiments, campaign control systems 108 may include virtual representations of hardware operating, for example, on a virtualization server.

Figure 2:
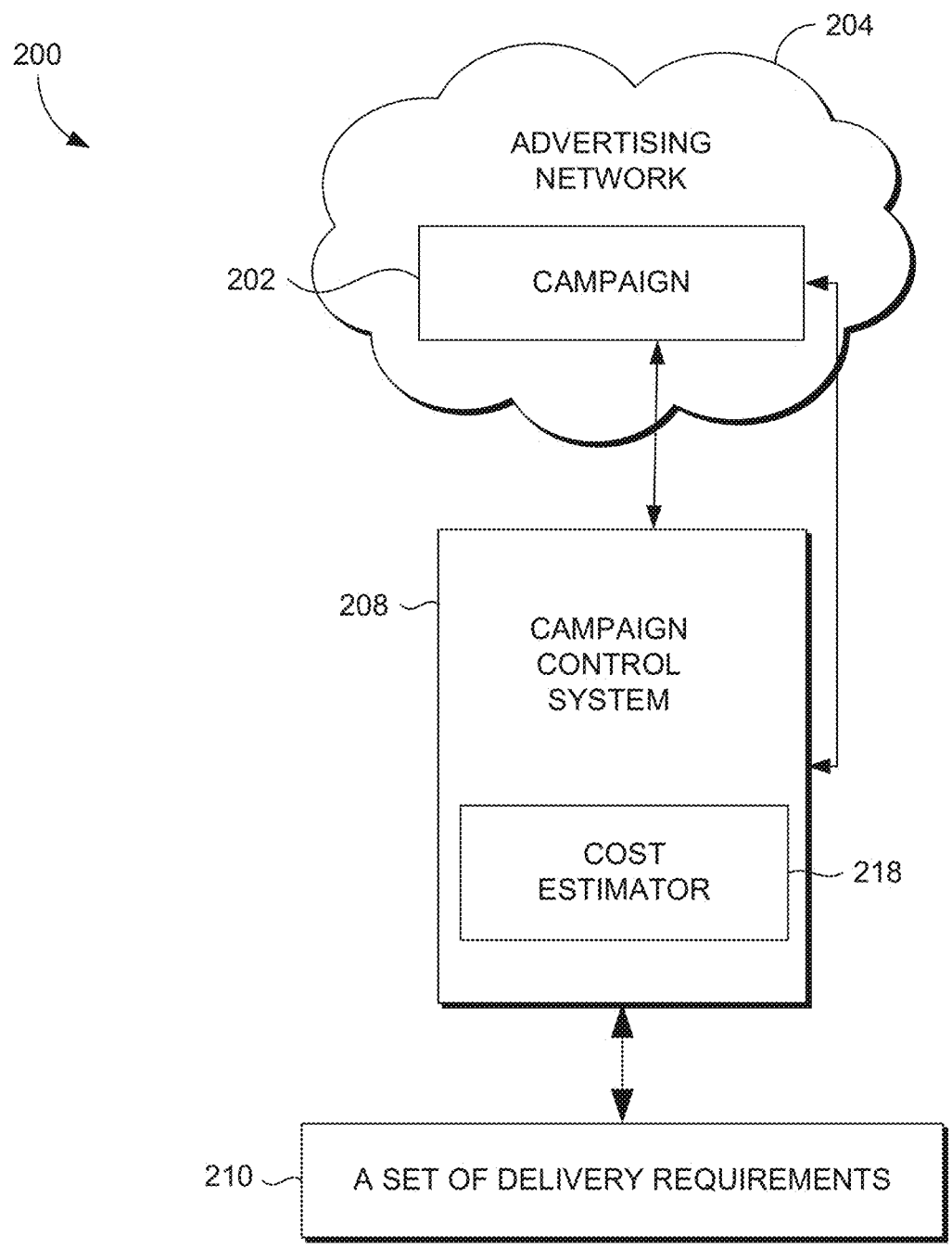
FIG. 2 depicts an illustrative online advertising control system for controlling an online advertising campaign operating in an online advertising network, in accordance with various embodiments of the present disclosure.

FIG. 2 depicts an illustrative online advertising or marketing environment 200 for controlling an online advertising or marketing campaign 202 operating in an online advertiser or marketing network 204. Advertising network 204 may include a network or collection of one or more advertisers 102, one or more publishers 104, ad servers 106, campaign control systems 208, or other components of system 100 of FIG. 1. Elements of advertising network 204 may operate to receive impression requests associated with one or more advertising inventories, e.g., from publishers 104 such as websites or other computing components with an inventory of online marketing space. Advertising network 204 may also group impression requests for various advertising campaigns, e.g., according to impressions to be "targeted" based on a combination of attributes defined by the marketing requests. Advertising network 204 may also accept bids (e.g., from one or more campaign control systems 208) on the impression requests and process the bids to serve ads to the impression requests.

Any number or type of advertising campaigns 202 may be operated within advertising network 204, across various ad servers and domains associated with the Internet. Online advertising environment 200 may be implemented by one or more of the advertisers 102, publishers 104, ad servers 106, and/or campaign control systems 108 described in FIG. 1. For example, online advertiser environment 200 may represent the interaction of one or more campaign control systems 108 with other computing components in system 100.

Figure 7:
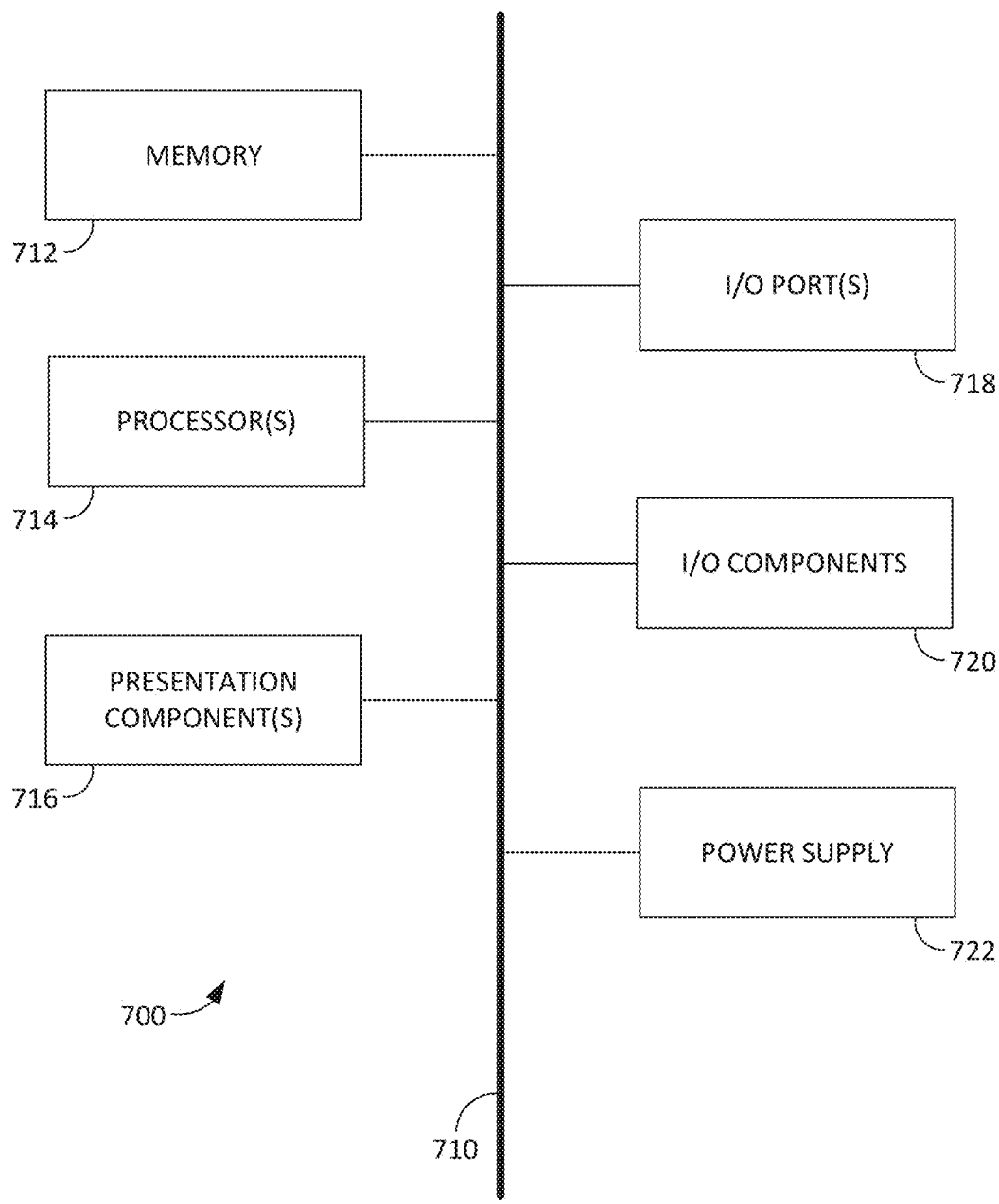
FIG. 7 is a block diagram of an example computing device in which various embodiments of the present disclosure may be employed.

In one embodiment, online advertising environment 200 may include one or more instances of campaign control system 208. Various embodiments of campaign control system 208 are discussed in conjunction with at least campaign control system 300 of FIG. 3A. Campaign control system 208 may include, or be similar to at least one of campaign control systems 108 of FIG. 1. Campaign control system 208 may comprise computers or servers connected to the Internet. Such computers or servers may be configured as described with respect to campaign control system 108, as depicted by FIGS. 1 & 7, or in any other suitable configuration. Alternatively, campaign control system 208 may be implemented by software modules executed by CPUs 114 of campaign control system 208. Campaign control system 208 may be embodied entirely in hardware, entirely in software, or in any combination of hardware and software implemented across any number of computing devices.

Campaign control system 208 may be provided with a set of delivery requirements 210, which may be adjustable design parameters set by a user. For instance, the set of delivery requirements may include cost requirements, pacing requirements (e.g., daily budget goals, daily impression delivery goals), targeting requirements (e.g., based on a demographic analysis), and/or spread requirements (e.g. to control advertising across inventory units/cells, and/or user targets, etc.). The set of delivery requirements 210 may be implemented by one or more campaign control systems, including but not limited to campaign control system 208. For example cost estimator 218 may be configured to produce a cost estimate with a controlled volatility and/or responsiveness. This could be accomplished by translating a desired relative volatility to a specific estimator gain, as described in detail herein. The desired relative volatility may be, for example, a user (e.g., marketer) defined value.

In one embodiment, campaign control system 208 may be a control system configured to assist an advertising campaign 202 by minimizing, or at least controlling the effective cost (to the advertiser) per event of interest or impression (eCPX), while simultaneously meeting pacing goals and/or other delivery requirements 210. In accordance with the disclosed embodiments, campaign control system 208 may be configured to control bid price, and optionally allocation signals, to minimize or control the effective cost per event of interest or impression (eCPX), while optimizing the revenue spending of the ad campaign in accordance with an objective set by a user via the set of delivery requirements 210. Such objectives may include, for example, a smoothness objective in which campaign control system 208 manages campaign delivery to achieve smoothness in revenue spending over the course of the campaign. In one embodiment, campaign control system 208 may implement at least some of the illustrative systems and methods described in U.S. patent application Ser. No. 13/416,796, filed on Mar. 9, 2012, the entire disclosure of which is incorporated herein by reference.

Controlling Effective Cost Per Event of Interest or Impression

FIG. 3A depicts a block diagram of a portion of an illustrative campaign control system 300 for controlling online campaigns by minimizing (or at least controlling) eCPX for any particular X of interest, in accordance with various embodiments of the present disclosure. At least one of campaign control system 108 or campaign control system 208 of FIG. 2 may include similar features, functionality, and/or structure to campaign control system 300 of FIG. 3A.

As noted throughout, controlling online campaigns may include minimizing, or at least controlling an effective cost per event of interest or impression (eCPX) while constrained by a desired pacing and/or a maximum cost. As noted above, "X" may represent any adequately defined event or impression. Each of these constraints (desired pacing and maximum cost) may be set by the advertiser and/or marketer. Furthermore, campaign control system 300 may be configured to carry out, implement, and/or enable any of the various processes and/or work flows discussed herein, including but not limited to workflow 380 of FIG. 3C.

Campaign control system 300 may generally be configured to utilize data previously observed in market 330. This data can be utilized to control subsequent bids placed in market 330 to facilitate, for example, minimizing or at least controlling an eCPX (for any event type X of particular interest), while constrained by the desired pacing and max cost. As noted above, an event may include but is not otherwise limited to click types such as click events, conversion events, viewable impressions, and the like.

As depicted in FIG. 3A, campaign control system 300 includes a controller 310, a cost actuator 320, a market 330, a cost estimator 350, and a plurality of segment performance rate estimators 360. Each of these components may be communicatively coupled with one another, for example, as depicted in FIG. 3A. This communicative coupling may be, for example, via a bus, network, shared memory, etc., or any combination thereof. Note that any of the signals, values, quantities, parameters, or the like discussed in conjunction with at least FIGS. 3A and 3B may be time-dependent and/or temporally varying signals, values, quantities, and the like.

Figure 4:
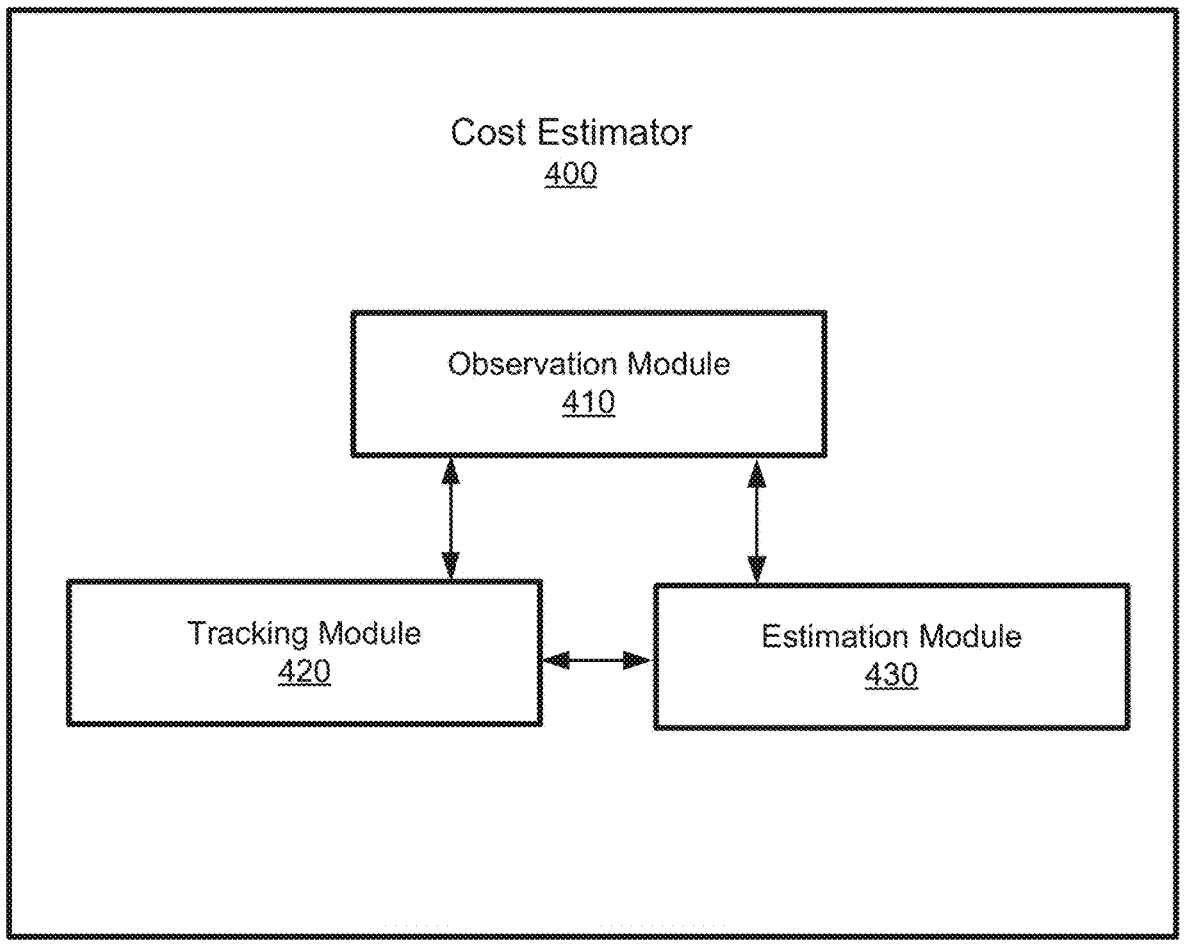
FIG. 4 shows a schematic diagram that illustrates an example cost estimator in accordance with various embodiments of the present disclosure.
Figure 5:
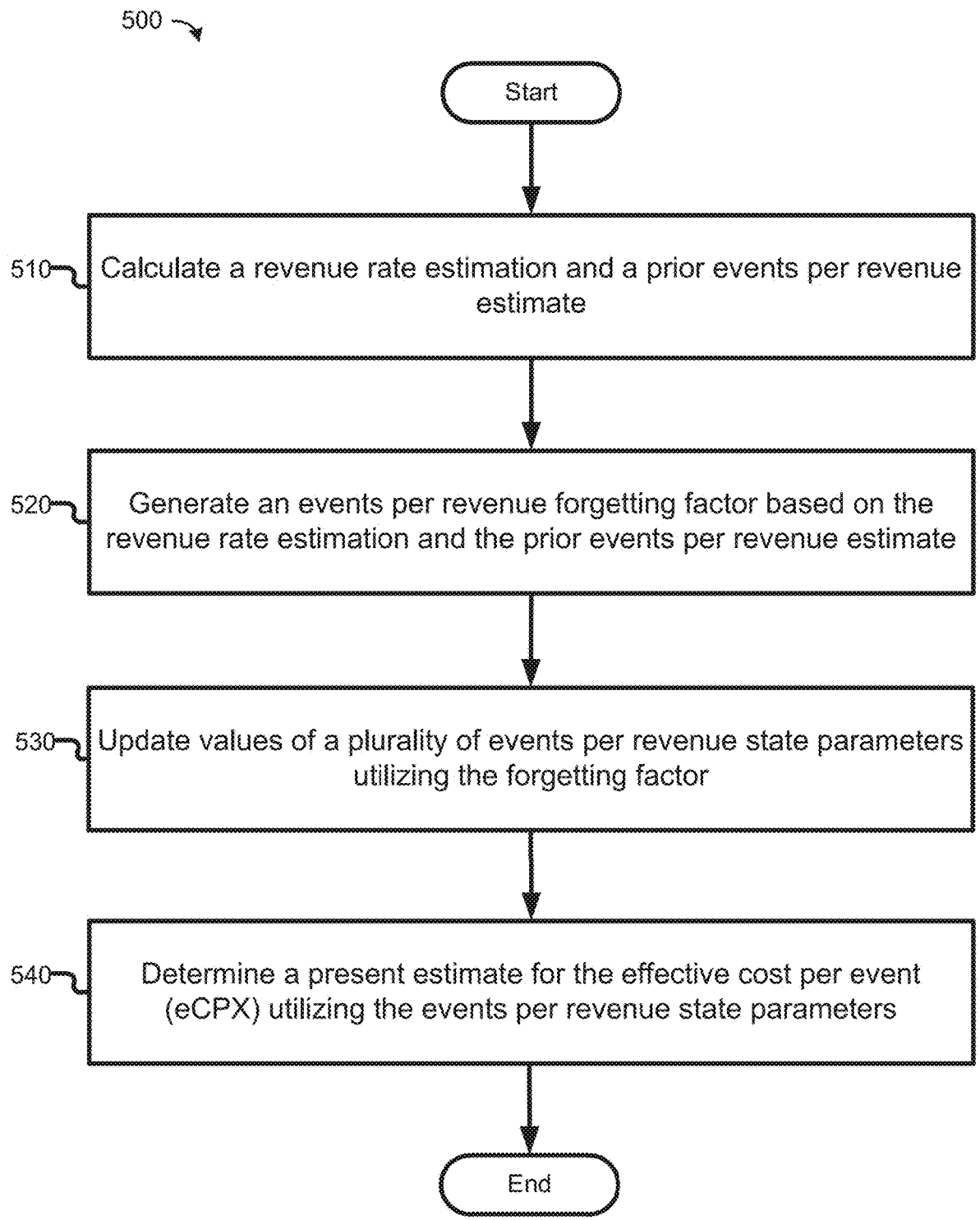
FIG. 5 depicts an illustrative process flow for adaptively estimating an effective cost per event of interest or impression, in accordance with various embodiments of the present disclosure.
Figure 6:
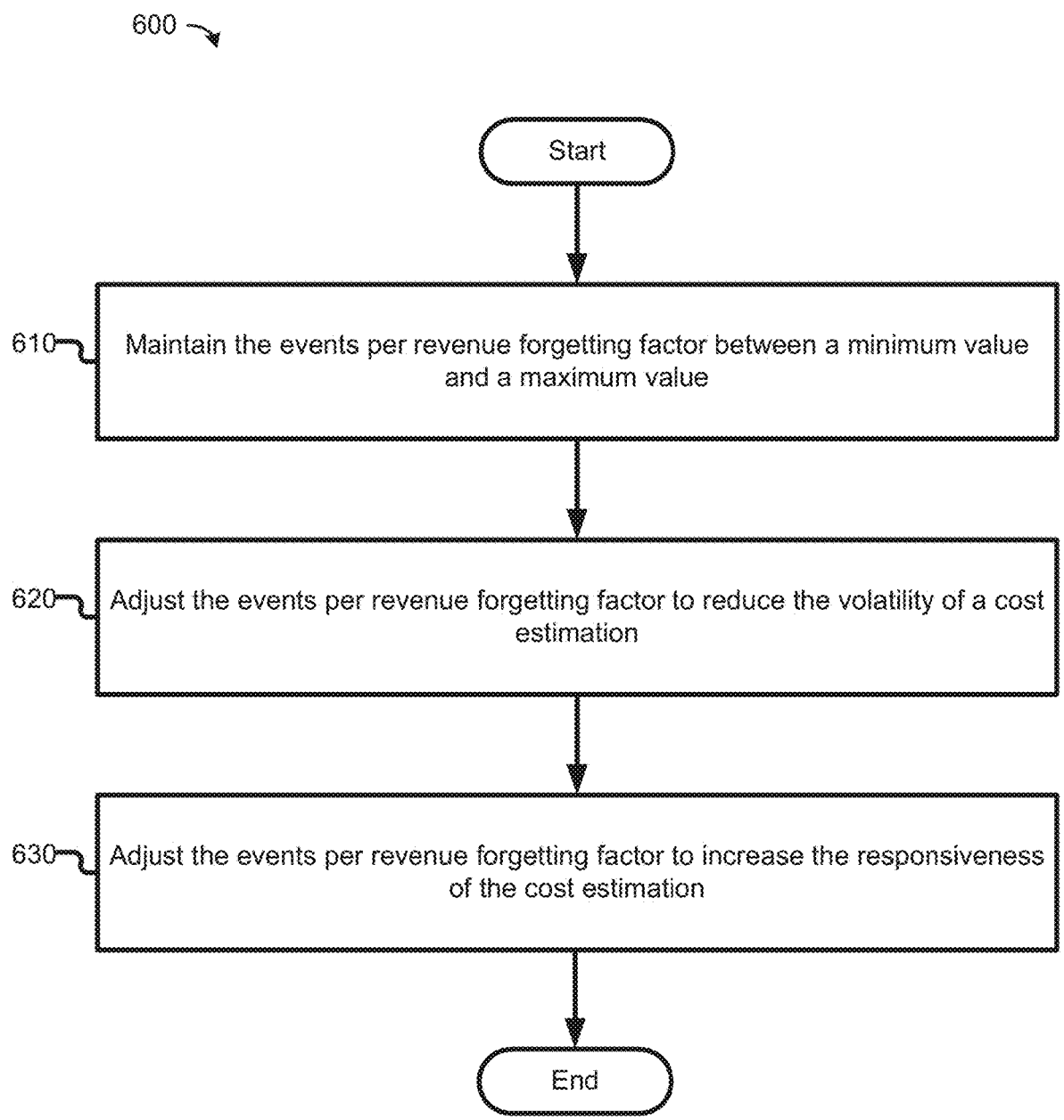
FIG. 6 depicts an illustrative process flow for adjusting a forgetting factor for the adaptive estimation of the cost per event or impression, in accordance with various embodiments of the present disclosure.

Various embodiments of a cost estimator, such as but not limited to cost estimator 350 are discussed in conjunction with at least cost estimator 400 of FIG. 4 and/or work flows 500 and 600 of FIGS. 5 and 6 respectively. However, briefly, cost estimator 350 may determine the eCPX, for any particular event type X. Cost estimator 350 is configured to take as input an observed event volume, $n_E$ (for any event type X) and observed revenue, or pacing, r. In some embodiments, the observed pacing may be an estimated pacing or estimated revenue. The observed event volume and the observed revenue can be determined from actual event volume and revenue observed in market 330.

The observed event volume and/or the observed pacing may be a moving average calculated over a period of time. This period of time can be any duration of time that may be selected based upon certain campaign characteristics. For example, a shorter period of time can enable quicker reflection of changes in market 330; however the results could be noisier than those of a moving average calculated over a longer period of time. A moving average calculated over a longer period of time, on the other hand, can be less noisy than a moving average calculated over a shorter period of time, but is slow to react to changes in market 330. As a result, the time period for such a moving average may be dependent on the campaign and/or volatility of market 330. The above discussed moving average may be calculated by a moving average filter that could be located in-line between market 330 and cost estimator 350. Discrete observed event volume and observed revenue in market 330 may be monitored, for example, via an event volume sensor and a revenue sensor configured to obtain real-time data about the campaign to which campaign control system 300 is assigned.

Cost estimator 350 may determine, generate, calculate, or otherwise produce an estimated cost (ĉ) based, at least in part, on the observed event volume, $n_E$, and the observed revenue, r. In various embodiments, the estimated cost may include eCPX for a particular event type X. The particular event type may be provided by the user. In various embodiments, the estimated cost may be an observed cost. In at least one embodiment, the estimated cost may be a cost estimate.

As discussed in conjunction with at least FIGS. 4-6, cost estimator 350 can be configured to produce the estimated cost and/or the eCPX with a controlled volatility and/or responsiveness. This could be accomplished by translating a desired relative volatility to a specific estimator gain, as described in detail herein. The desired relative volatility may be, for example, a user (e.g., marketer) defined value.

As shown in FIG. 3A, campaign controller 310 is configured to take as input a max cost reference signal, $T^{max}$, or max cost. Campaign controller 310 is also configured to take as input a desired pacing reference signal, B'. At least one of max cost or the desired pacing may be defined, supplied, or provided by a user (such as but not limited to an advertiser and/or marketer). Campaign controller 310 is also configured to take as input the observed pacing, r, and the cost estimate, ĉ, which is determined, generated, calculated and/or produced by cost estimator 350.

Campaign controller 310 is configured to determine at least one of a price control signal ($u_p$) and an allocation control signal ($u_a$) that minimizes (or at least controls) the eCPX. Each of price control signal and allocation control signal may be referred to as a control signal. In some embodiments, the allocation control signal represents the percentage or ratio (e.g., point value from 0 to 1) of inventory the ad campaign is willing to purchase at the bid price discussed below. Thus, in various embodiments, campaign controller 310 updates each of the price control signal and the allocation control signal such that eCPX is minimized (or at least controlled), while the observed pacing approximately converges to a closest pacing to the desired pacing while observed cost remains at or below max cost.

The price control signal and/or the allocation control signal may be determined based, at least in part, on a function of the max cost, desired pacing, observed pacing, and cost estimate. This function may be configured to attempt to facilitate minimizing or at least controlling the eCPX, while obtaining the desired pacing within the limits of max cost and/or inventory available in market 330.

In some embodiments, campaign controller 310 is configured to periodically (or aperiodically) update at least one of the price control signal or the allocation control signal. These updates may take place at predefined time intervals (e.g., every 15 minutes), based on a specific occurrence (e.g., based on a magnitude of change to observed pacing), or any other suitable period. In other embodiments, campaign controller 310 may update at least one of the control signals in real time (or near real time) as the input (or reference) signals and/or feedback signals are updated or varied.

To facilitate minimizing or controlling eCPX, while constrained by a desired pacing and the max cost, campaign controller 310 may employ one or more adaptive control schemes. For instance, campaign controller 310 may employ a function $f(r, ĉ, T^{max}, B^{max})$ to minimize or control eCPX, while obtaining the desired pacing by adaptively determining at least one of the price control signal $u_p$ or the allocation control signal $u_a$. Such an adaptive control scheme may determine at least one of $u_p$ or $u_a$ based on most recent values of the reference signals and/or feedback signals, in conjunction with a stored controller state variable, which includes information about the past control performance. The adaptive control scheme is known in the art and a person of ordinary skill in the art would be able to implement such a control scheme. In other embodiments, alternative control schemes may be utilized in place of the adaptive control schemes. Such control schemes are known in the art and would include an optimal control scheme, a model predictive control scheme, a proportional-integral-derivative (PID) control scheme, a robust control scheme, a stochastic control scheme, or any other suitable control scheme. An alternative embodiment of campaign controller 310 is discussed in conjunction with campaign controller 370 of FIG. 3B.

Segment performance rate estimators 360 are configured to take as input an observed impression volume for a segment, $n_{I,i}$, and an observed event volume for the segment (for any particular event type X of interest), $n_{E,i}$. The 'i' refers to the segment in which the observed impression volume and the observed event volume are observed. The observed impression volume, $n_{I,i}$, and the observed event volume, $n_{E,i}$, for each segment can be determined from actual observations in market 330 pertaining to the respective segment. Discrete observed impression volumes for the segments and discrete observed event volumes for the segments may be monitored in market 330, for example, via segment impression sensors (not depicted) and segment event sensors (not depicted), respectively, configured to obtain real-time data about the segment to which these components are assigned. Segment performance rate estimator 360 can output a performance prediction, $\hat{p}_i$, for each segment ('i').

As shown in FIG. 3A, cost actuator 320 takes the price control signal, $u_p$, and allocation control signal, $u_a$, as input. In addition, cost actuator 320 can take the one or more segment performance predictions, $\hat{p}_i$, as input. Again, the 'i' refers to the segment to which the segment performance prediction belongs. Cost actuator 320 may utilize the combination of the price control signal, $u_p$, the allocation signal, $u_a$, and the segment performance predictions, $\hat{p}_i$, to determine a bid price, $b_i$, and an allocation at that bid price, $a_i$, for the respective segment. Thus, cost actuator 320 may generate, update, adjust, modify, and/or verify each of the bid price and the bid allocation. In some embodiments, the bid price, $b_i$, is calculated by taking the product of $u_p$ and $\hat{p}_i$ for each i. These bids are depicted by the individual arrows flowing from cost actuator 320 to market 330. In other embodiments, the bid price may be a capped segment bid price calculated, for example, using the equation $b_i$=min (maxCPI, $u_p\hat{p}_i$), where maxCPI is max cost per impression, or, as another example, equation $b_i$=min(maxCPI$_i$, $u_p\hat{p}_i$), where maxCPI$_i$ is max cost per impression for segment i. It will be appreciated by someone of ordinary skill in the art that these examples are merely meant to be illustrative and are not intended to limit the scope of this disclosure. For example, min can be replaced by max and/or the min (max) operation may be conditional based on user, ad, or impression specific information. In addition, the capping may apply only for a certain type of user, a certain time of the day, a certain geographic region, etc.

Market 330 represents a bidding environment in which advertisers place ad requests for marketing space that is offered by publishers. The above discussed components facilitate a marketer minimizing or at least controlling the eCPX, while obtaining the desired pacing within the limits of max cost $T^{max}$ and/or inventory available in marketing market 330.

Figure 3B:
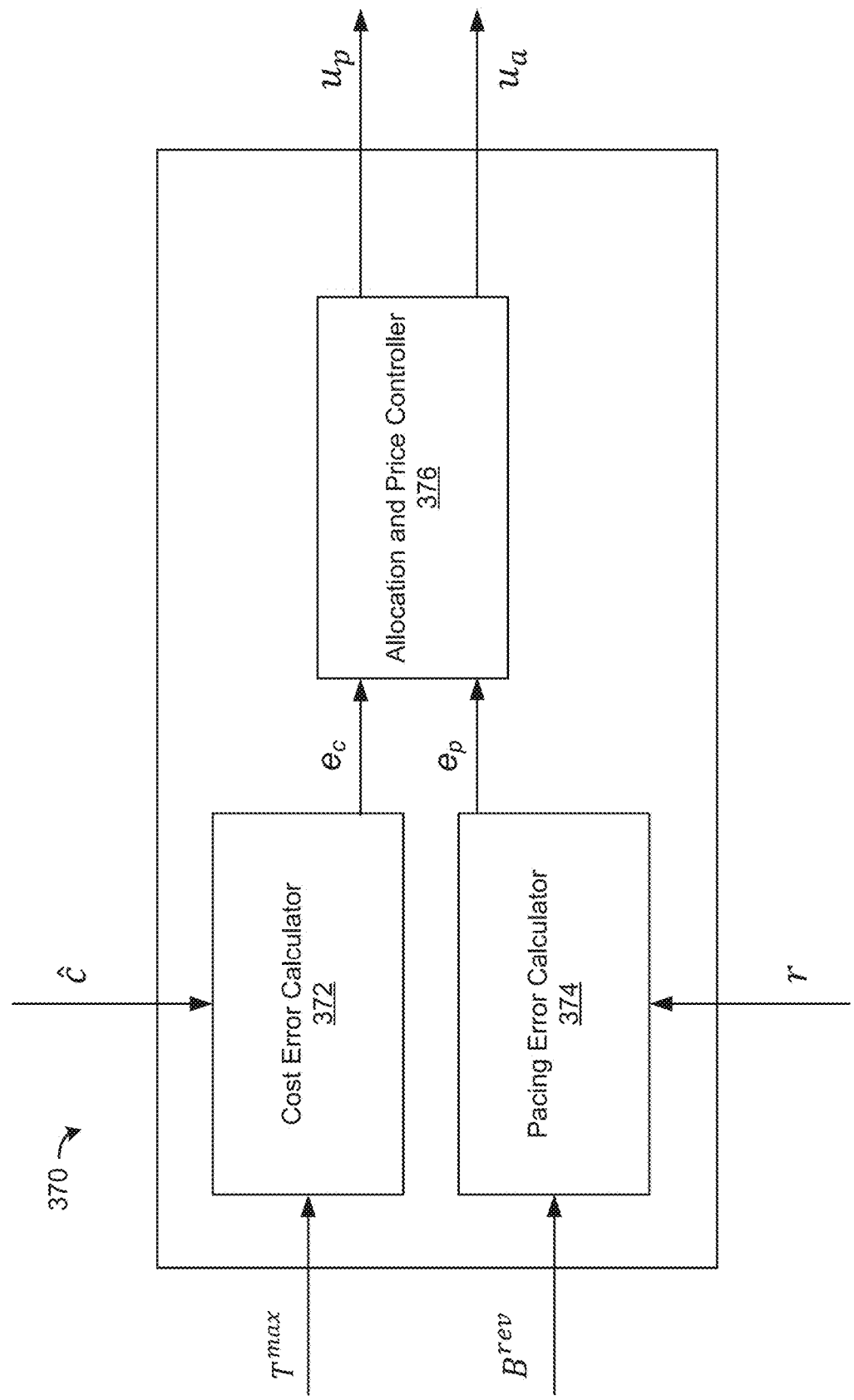
FIG. 3B depicts a block diagram of an alternative embodiment for a campaign controller for controlling online advertising campaigns, in accordance with various embodiments of the present disclosure.

FIG. 3B depicts a block diagram of an alternative embodiment for a campaign controller 370 for controlling online advertising campaigns, in accordance with various embodiments of the present disclosure. Any of the various campaign control systems discussed herein, including but not limited to campaign control systems 108 of FIG. 1, campaign control system 208 of FIG. 2, and campaign control system 300 of FIG. 3A may include a campaign controller, such as but not limited to campaign controller 370. For instance, campaign control system 300 may include campaign controller 370 in place for campaign controller 310 of FIG. 3A.

As depicted, campaign controller 370 includes at least a cost error calculator 372, a pacing error calculator 374 and an allocation and price controller 376. Cost error calculator 372 is generally configured to generate a cost error signal, ($e_c$). A cost error signal may be utilized, as described herein, to adjust a bid price for an advertising campaign. As depicted, cost error calculator 372 is configured to take as input the max cost signal (as discussed above) ($T^{max}$), hereinafter merely referred to as max cost.

In addition to max cost, cost error calculator 372 is also configured to take as input the estimated cost ($\hat{c}$), as determined via a cost estimator, such as but not limited to at least one of cost estimator 350 of FIG. 3A or cost estimator 400 of FIG. 4.

Cost error calculator 372 may be configured to utilize the max cost and the estimated cost to determine the cost error signal (or simply a cost error) ($e_c$). In some embodiments, cost error signal is determined by taking the difference between max cost and the estimated cost. In such embodiments, $e_c$ can be considered as a measurement of how far from max cost the campaign is at a sampled time. If $e_c$<0, then the estimated cost is higher than max cost and may need to be reduced moving forward by the controller via a reduction of $u_p$. If on the other hand $e_c$>0, then there is room to increase the cost as necessary in an effort to deliver the desired pacing.

Pacing error calculator 374 is generally configured to generate a pacing error signal (or simply a pacing error) ($e_p$). The pacing error signal may also be utilized, as described herein, to adjust a bid price for an advertising campaign. As depicted, pacing error calculator 374 is configured to take as input a desired pacing reference signal, $B^{rev}$, hereinafter merely referred to as desired pacing as discussed above.

In addition to the desired pacing, the pacing error calculator 374 is also configured to take as input observed pacing signal (r), as discussed above. Pacing error calculator 374 may be configured to utilize the above discussed desired pacing and observed pacing to determine a pacing error signal, ($e_p$). In some embodiments, the pacing error signal may be determined by taking the difference between desired pacing and observed pacing. In such embodiments, $e_p$ can be considered as a measurement of how far from desired pacing the campaign is at a sample time. If $e_p$<0, then the observed pacing is higher than desired pacing and can be reduced moving forward by the controller by via a reduction of $u_p$. If on the other hand $e_p$>0, then observed pacing is less than desired pacing and may need to be increased provided there is room to increase the cost.

As shown in FIG. 3B, the cost error signal and pacing error signal may be output to allocation and price controller 376 by cost error calculator 372 and pacing error calculator 374, respectively. Allocation and price controller 376 may be configured to take the cost error signal and the pacing error signal as input, which may also be considered error feedback signals. Allocation and price controller 376 may be configured to determine at least one of a price control signal or allocation control signal.

To facilitate minimizing or controlling eCPX, while constrained by a desired pacing and the max cost, allocation and price controller 376 may employ one or more adaptive control schemes. For instance, at least one of the price control signal or allocation control signal may be determined based, at least in part, on the respective cost error signal and/or the pacing error signal. In embodiments, at least one of these control signals is a result of or based upon a function of the cost error signal and the pacing error signal, $f(e_c, e_p)$. This function may be configured to attempt to facilitate minimizing or controlling eCPX, while constrained by a desired pacing and the max cost, and obtaining the desired pacing within the limits of max cost and/or inventory available in an advertising marketplace In some embodiments, allocation and price controller 376 may be configured to periodically update the price control signal $u_p$, as well as an allocation control signal $u_a$. These periodic updates may take place at predefined time intervals (e.g., every 15 minutes), based on a specific occurrence (e.g., based on a magnitude of change to an error signal), or any other suitable period. In other embodiments, allocation and price controller 376 may update the control signals in real time as the above discussed error signals, or reference signals, change.

Figure 3C:
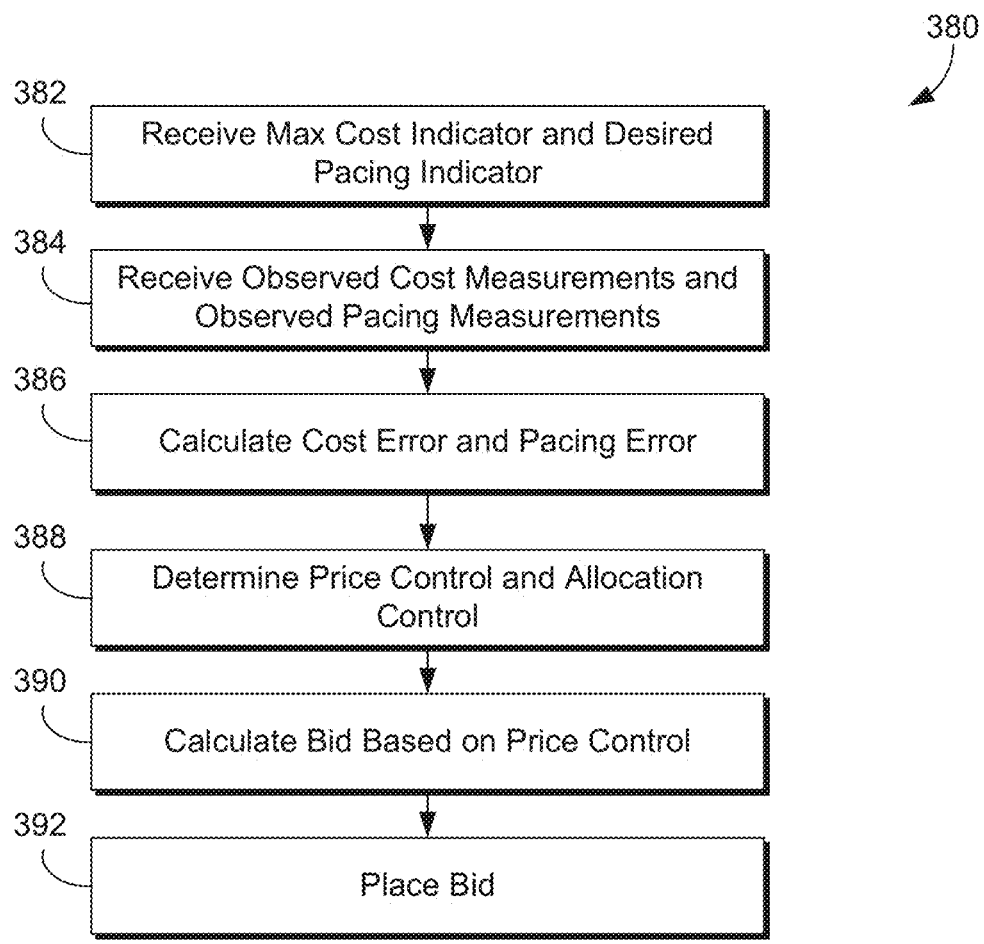
FIG. 3C depicts an illustrative process flow for minimizing, or at least controlling, an effective cost per event of interest or impression while controlling online advertising campaigns, in accordance with various embodiments of the present disclosure.

FIG. 3C depicts an illustrative process flow 380 for minimizing, or at least controlling, an effective cost per event of interest or impression while controlling online advertising campaigns, in accordance with various embodiments of the present disclosure. Any of the various campaign control systems discussed herein, including but not limited to campaign control systems 108 of FIG. 1, campaign control system 208 of FIG. 2, or campaign control system of 300 of FIG. 3A may employ, implement, or execute at least portions of process flow 380. Process flow 380 may begin at block 382 where a max cost indicator (referred to as $T^{max}$ or simply max cost in conjunction with at least FIGS. 3A and 3B) and/or a desired pacing indicator (referred to as $B^{rev}$ or simply desired pacing in conjunction with at least FIGS. 3A and 3B) are received. As discussed in conjunction with FIGS. 3A and 3B, such indicators may also be referred to herein as signals.

At block 384 an observed cost measurement (referred to as $\hat{c}$ or cost estimate in conjunction with at least FIGS. 3A and 3B) and an observed pacing measurement (referred to as r or observed pacing in conjunction with at least FIGS. 3A and 3B) are received. As noted throughout, the observed cost measurement may include, or be equivalent to eCPX. Various embodiments for determined the observed cost estimate are discussed in conjunction with at least cost estimator 350 of FIG. 3A, cost estimator 400 of FIG. 400, and process flows 500 and 600 of FIGS. 5 and 6. However, briefly here, the observed cost measurement (or cost estimate) can be determined from actual costs for events that are monitored in an advertising marketplace (e.g., advertising marketplace 330 of FIG. 3A). Similarly, the observed pacing measurement can be determined by monitoring actual pacing, or revenue, in an advertising marketplace. Each of the observed cost measurement and the observed pacing measurement may be a moving average calculated over a period of time. This period of time can be any duration of time that may be selected based upon certain campaign characteristics and subject to the same considerations for the period of time discussed above in reference to the observed cost measurement.

At block 386, the above discussed max cost indicator and observed cost measurement can be utilized to calculate a cost error (referred to as $e_c$ in conjunction with at least FIG. 3B). In some embodiments, this may be accomplished by taking the difference between the max cost indicator and the observed cost measurement. In addition, the above discussed desired pacing indicator and the observed pacing measurement may be utilized to calculate a pacing error (referred to as $e_p$ in conjunction with at least FIG. 3B). As with the cost error, in some embodiments, the pacing error is calculated by taking the difference between the desired pacing and the observed pacing.

At block 388 a price control (referred to as price control signal or $u_p$ in conjunction with at least FIGS. 3A and 3B) and an allocation control (referred to as allocation control signal or $u_a$ in conjunction with at least FIGS. 3A and 3B) may be determined based on the cost error and the pacing error. In some embodiments, at least one of the price control or the allocation control is a result of a function (e.g., and/or a function $f(r, ĉ, T^{max}, B^{max})$ discussed above in reference to FIG. 3A, and/or function $f(e_c, e_p)$ discussed above in reference to FIG. 3B). This function may be configured to attempt to facilitate minimizing or at least controlling eCPX, while constrained by a desired pacing and the max cost, and obtaining the desired pacing within the limits of max cost and/or inventory available in an advertising marketplace. As such, each of $u_a$ and $u_p$, in some embodiments, can be updated in such a way that eCPX is minimized (or at least controlled), while the observed pacing converges to a closest pacing to the desired pacing while observed cost remains at or below max cost.

At block 390 a bid is calculated based on the price control and allocation control determined at block 388. In embodiments, a bid may be calculated for each segment or cell of an advertising marketplace that is of interest to the advertising campaign. Finally at block 392, the bid is placed with the advertising marketplace.

Estimating Cost of Events

Referring now to FIG. 4, a schematic diagram illustrates an example cost estimator 400 in accordance with various embodiments of the present disclosure. Any of the various campaign control systems discussed herein, including campaign control systems 108 of FIG. 1, campaign control system 208 of FIG. 2, or campaign control system 300 of FIG. 3A may include and/or employ a cost estimator, such as but not limited to cost estimator 400. For instance, cost estimator 350 of FIG. 3A may include equivalent and/or similar features to cost estimator 400.

Cost estimator 400 can determine, generate, calculate, update, or otherwise provide an estimated eCPX (for any particular event type X) with a controlled volatility by translating a relative volatility of events per revenue to a specific estimator gain. It will be appreciated that the events per revenue merely represents an inverse of the eCPX, thus, the translation of relative volatility of events per revenue to a specific estimator gain can be transformed into a relationship between the estimator gain and a cost estimate volatility. In some embodiments, cost estimator 400 includes observation module 410, tracking module 420, and estimation module 430, operatively and/or communicatively coupled with one another.

In embodiments, observation module 410 can observe an event volume, represented herein by $n_E(k)$, and revenue, represented herein by $r(k)$, of a campaign, where 'k' refers to a current logical interval, or state, of the campaign. In operation, a campaign may be logically or arbitrarily divided into various logical intervals. Logical intervals may be uniformly divided time intervals, such as based on second, minute, hour, day, week, month, or so on. In addition, logical intervals may be logically tied with certain units or milestones in a campaign. Such units may relate to orders of a product or services after launching the campaign, e.g., every thousand orders. Such units may also, or alternatively, include a unit of budget spend on the campaign, e.g., every thousand dollars. In these cases, where the logical intervals are logically tied with certain units or milestone in a campaign, the logical intervals may be considered heterogeneous time intervals.

In some embodiments, observation module 410 may receive the observed event volume and observed revenue, from another computing device, or via input from a user (e.g., as an initialization setting where a previous logical interval has yet to occur). The observed event volume can include the volume of events for any particular event type X.

As depicted, observation module 410 is coupled with tracking module 420. Tracking module 420 can track state information of multiple state variables, such as those discussed below, from previous logical intervals. This state information from a previous logical interval can be used by estimation module 430 to provide cost estimates for a present logical interval. For example, tracking module 420, can track state variables for estimating a revenue rate (e.g., $\alpha_r(k)$ and $\beta_r(k)$) hereinafter referred to as revenue state variables, and state variables for estimating events per revenue (e.g., $\alpha_\rho(k)$ and $\beta_\rho(k)$), hereinafter referred to as events per revenue state variables. In some embodiments, as the campaign evolves, tracking module 420 may only need to keep the state information from the immediately preceding logical interval (i.e., the last state).

In embodiments, estimation module 430 can take as input observed event volume and revenue for a current state, which can be received from observation module 410, and state variables from a previous state from tracking module 420. From these inputs, estimation module 430 can provide cost estimates for the present logical interval (i.e., the present state). In various embodiments, such estimation may be based at least in part on the state information, e.g., tracked by tracking module 420; and the observed event volume and observed revenue in the current logical interval, (e.g., $n_E(k)$ and $r(k)$ respectively), observed by observation module 410. Such estimation may be further based at least in part on a revenue forgetting factor ($\lambda_r$) and an events per revenue forgetting factor ($\lambda_r$), discussed in greater detail below. Additionally, such estimation may be further based at least in part on a relative volatility reference parameter ($\sigma_{ref}$), also discussed in greater detail below.

In operation, estimation module 430 may store, receive, or otherwise have access to various configuration parameters for providing cost estimates. For instance, estimation module 430 may access the initialization values for the revenue forgetting factor ($\lambda_r$), which could, for example, be user defined; the relative volatility reference parameter ($\sigma_{ref}$), which again could be user defined; and the initialization values for various state variables which, yet again, could be user defined. For example, for revenue rate estimation, estimation module 430 may access initialization values $\alpha_{r,0}$ and $\beta_{r,0}$, and can assign these initialization values to initial states $\alpha_r(0)$ and $\beta_r(0)$, respectively. In addition, for events per revenue estimation, estimation module 430 may access initialization values $\alpha_{\rho,0}$ and $\beta_{\rho,0}$, and can assign these initialization value to initial states $\alpha_\rho(0)$ and $\beta_\rho(0)$, respectively.

The revenue forgetting factor ($\lambda_r$) may be utilized to discount the importance of revenue state variables associated with the previous logical interval in updating values of these revenue related state variables for a present logical interval. As an example, consider the following equation:

$$\alpha_r(k) = \lambda_r^h \alpha_r(k-1) + r(k) \qquad \text{Eq. 1}$$

where $\alpha_r(k)$ represents a first revenue state variable at a current state, k; $\lambda_r^h$ represents a revenue forgetting factor; $\alpha_r(k-1)$ represents the first revenue state variable at a previous state, k−1; and r(k) represents the observed revenue in the current state. The variable 'h' in Eq. 1 is an indicator of the length of time of the logical interval. For example, if the logical interval is ten minutes, then 'h' would be ten. As such, as the logical interval increases, the effect of the revenue forgetting factor would be increased. In contrast, as the logical interval decreases, the effect of the revenue forgetting factor would be reduced. It will be appreciated that the variable 'h' can be omitted from some embodiments, without departing from the scope of this disclosure. From Eq. 1, it can be seen that a forgetting factor $\Delta_r$ that is between than 0 and 1 would act to reduce the impact of the previous state, $\alpha_r(k-1)$, on the current state, $\alpha_r(k)$. In addition, it would follow that a $\lambda_r$ that is closer to 0 would more greatly discount the impact of the previous state on the current state than a $\lambda_r$ that is closer to 1. As such, adjusting $\lambda_r$ between 0 and 1 can affect the volatility of the first revenue state variable from one state to the next.

Similarly, consider the following equation:

$$\beta_r(k) = \lambda_r^h \beta_r(k-1) + 1 \qquad \text{Eq. 2}$$

where $\beta_r(k)$ represents a second revenue state variable at a current state, k; $\lambda_r^h$ again represents a revenue forgetting factor, where 'h' again is dependent on the length of time of the logical interval; and $\beta_r(k-1)$ represents the second revenue state variables at a previous state, k−1. From this equation, it can also be seen that a forgetting factor $\lambda_r$ that is between than 0 and 1 would act to reduce the impact of the previous state, $\beta_r(k-1)$, on the current state, $\beta_r(k)$. In addition, as above, it would follow that a $\lambda_r$ that is closer to 0 would more greatly discount the impact of the previous state on the current state than a $\lambda_r$ that is closer to 1. As such, adjusting $\lambda_r$ between 0 and 1 can affect the volatility of the second revenue state variable from one state to the next.

Estimation module 430 may calculate values for the revenue state variables ($\alpha_r(1)$ & $\beta_r(1)$) based on an initial revenue state ($\alpha_r(0)$ and $\beta_r(0)$). Estimation module 430 can then recursively update the revenue state variables based at least in part on the observed revenue (r(k)) and the revenue forgetting parameter ($\lambda_r$). As shown in Eq. 1 and Eq. 2, revenue state variables $\alpha_r(k)$ and $\beta_r(k)$, in a current state, k, can be updated based on their values in a previous state, k−1, and the observed revenue, r(k). Estimation module 430 may then determine an estimated revenue rate ($\hat{v}(k)$) for the present state based on the revenue related state variables, $\alpha_r(k)$ and $\beta_r(k)$. An example of such a determination is represented by Eq. 3

$$\hat{v}(k) = \frac{\alpha_r(k)}{\beta_r(k)} \qquad \text{Eq. 3}$$

where $\hat{v}(k)$ represents the estimated revenue rate at a current state, k.

Estimation module 430 may determine an event per revenue estimate of the current state (k). Such a calculation can be based on the events per revenue state variables of the previous state (k−1). An example of such a calculation is depicted in Eq. 4.

$$\hat{\rho}_{old}(k) = \frac{\alpha_\rho(k-1)}{\beta_\rho(k-1)} \qquad \text{Eq. 4}$$

The calculations of, $\alpha_\rho(k-1)$ and $\beta_\rho(k-1)$ beyond the initialization state are discussed in greater detail below, in reference to Eq. 7 and Eq. 8.

Estimation module 430 may also calculate a tentative events per revenue forgetting factor for the current state. An example equation for calculating such a tentative events per revenue forgetting factor is presented by Eq. 5

$$\lambda'_\rho(k) = 1 - 2\sigma_{ref}^2 \hat{v}(k) \hat{\rho}_{old}(k) \qquad \text{Eq. 5}$$

where $\lambda'_\rho(k)$ refers to the tentative events per revenue forgetting factor at state k; $\sigma_{ref}$ represents the aforementioned volatility reference parameter; $\hat{v}(k)$ represents the previously calculated estimated revenue rate; and $\hat{\rho}_{old}(k)$ represents the previously calculated events per revenue estimate.

The above calculated tentative events per revenue forgetting factor can be utilized by estimation module 430 to determine an actual events per revenue forgetting factor, $\lambda_\rho(k)$, hereinafter merely referred to as an events per revenue forgetting factor. In some embodiments, estimation module 430 may set, or receive user inputs setting, a minimum value ($\lambda_{\rho\_min}$) and a maximum value ($\lambda_{\rho\_max}$) as bounds for the events per revenue forgetting factor, $\lambda_\rho(k)$, at the current state, k. Estimation module 430 may then be configured to maintain the events per revenue forgetting factor, $\lambda_\rho(k)$, between the minimum value ($\lambda_{\rho\_min}$) and the maximum value ($\lambda_{\rho\_max}$). An example equation for maintaining the actual events per revenue forgetting factor is depicted by Eq. 6.

$$\lambda_\rho(k) = \begin{cases} \lambda_{\rho,min}^h, & \text{if } \lambda'_\rho(k) < \lambda_{\rho,min} \\ \lambda'_\rho(k), & \text{if } \lambda_{\rho,min} \leq \lambda'_\rho(k) \leq \lambda_{\rho,max} \\ \lambda_{\rho,max}^h, & \text{if } \lambda'_\rho(k) > \lambda_{\rho,max} \end{cases} \qquad \text{Eq. 6}$$

From the equation above, it can be seen that the events per revenue forgetting factor, $\lambda_\rho(k)$, can be set equal to the previously calculated tentative events per revenue forgetting factor, $\lambda'_\rho(k)$, if the tentative events per revenue forgetting factor is between the above mentioned bounds, $\lambda_{\rho\_min}$ and $\lambda_{\rho\_max}$, or equal to either of these bounds. If, on the other hand, the tentative events per revenue forgetting factor, $\lambda'_\rho(k)$, falls below $\lambda_{\rho\_min}$ or exceeds $\lambda_{\rho\_max}$, then the actual events per revenue forgetting factor, $\lambda_\rho(k)$, is set to the bound that the tentative events per revenue forgetting factor, $\lambda'_\rho(k)$, fell below or exceeded.

Similar to how the revenue related state variables are updated above, the events per revenue state variables, $\alpha_\rho(k)$ and $\beta_\rho(k)$, in current state (k), can also be updated recursively based on the events per revenue state variable values from the previous state, (k−1). To accomplish this, as mentioned previously, estimation module 430 may set values for initial states of the events per revenue state variables, $\alpha_\rho(0)$ and $\beta_\rho(0)$, to initialization values $\alpha_{\rho,0}$ and $\beta_{\rho,0}$, respectively. The events per revenue state variables, $\alpha_\rho(0)$ and $\beta_\rho(0)$, may be referred to herein, respectively, as first and second events per revenue state variables. Initialization values $\alpha_{\rho,0}$ and $\beta_{\rho,0}$ can be based, for example, on some default or initial values set by a user. The events per revenue state variables, $\alpha_\rho(k)$ and $\beta_\rho(k)$, can then be recursively updated based on the events per revenue forgetting factor, $\lambda_\rho(k)$. Additionally, in some embodiments, the observed event volume, $n_E(k)$, and the observed revenue, $r(k)$, in the current state, may also be used as the basis to update events per revenue state variables $\alpha_\rho(k)$ and $\beta_\rho(k)$. Example equations for recursively updating the events per revenue related state variables are depicted by Eq. 7 and Eq. 8.

$$\alpha_\rho(k) = \gamma^h \lambda_\rho(k) \alpha_\rho(k-1) + (1-\gamma^h) \alpha_{\rho,0} + n_E(k) \qquad \text{Eq. 7}$$

$$\beta_\rho(k) = \gamma^h \lambda_\rho(k) \beta_\rho(k-1) + (1-\gamma^h) \beta_{\rho,0} + r(k) \qquad \text{Eq. 8}$$

where $\gamma$ represents a drift/bias term towards the previous state; $\lambda_\rho$ represents the events per revenue forgetting factor; $\alpha_\rho(k-1)$ and $\beta_\rho(k-1)$ represent the events per revenue state variables from the previous state, $k-1$; $\alpha_{\rho,0}$ and $\beta_{\rho,0}$ represent the initialization values of the events per revenue state variables; $n_E(k)$ represents the observed event volume observed in the current state; and $r(k)$ represents the observed revenue observed in the current state. In some specific embodiments, $\gamma$ can be set smaller than, but very close to 1. In a specific embodiment, $\gamma$ can be chosen so that it is larger than any anticipated $\lambda_\rho$ (e.g. larger than $\lambda_{\rho\_max}$). Such a $\gamma$ can aid in avoiding numerical instability (e.g., by preventing division by zero in Eq. 9, discussed below) in the corner case where $n_E = r = 0$ over a period of time.

From equations 7 and 8, it can be seen that a forgetting factor $\lambda_\rho$ that is between 0 and 1 would act to reduce the impact of the previous state, $\alpha_\rho(k-1)$ and $\beta_\rho(k-1)$, on the current state, $\alpha_\rho(k)$ and $\beta_\rho(k)$, respectively. In addition, it would follow that a $\lambda_\rho$ that is closer to 0 would more greatly discount the impact of a previous state on a calculation of the current state than a $\lambda_\rho$ that is closer to 1. As such, adjusting $\lambda_\rho$ between 0 and 1 can affect the volatility of the events per revenue state variables from one state to the next. As an example, as $\lambda_\rho(k)$ approaches $\lambda_{\rho\_min}$, $\alpha_\rho(k)$ and $\beta_\rho(k)$ will depend less on the previous state and more on the observed event volume, $n_E(k)$, rather than the previous state variable value of $\alpha_\rho(k-1)$.

Similarly, in this case, $\beta_\rho(k)$ will depend more on the observed revenue, $r(k)$, rather than the previous state variable value of $\beta_\rho(k-1)$. On the other hand, when $\lambda_\rho(k)$ approaches $\lambda_{\rho\_max}$, $\alpha_\rho(k)$, $\beta_\rho(k)$ will depend more on the values in the previous state, namely $\alpha_\rho(k-1)$ and $\beta_\rho(k-1)$ respectively.

Because '$\rho$' represents the number of events per unit of revenue, e.g., number of events per cost, and can be estimated in accordance with equation 4, it would follow that the estimated cost per event or impression could be calculated by taking the inverse of $\rho$. As such, the cost per event or impression estimate ($\hat{c}(k)$), hereinafter referred to merely as cost, may be obtained, for example, according to Eq. 9.

$$\hat{c}(k) = \frac{\beta_\rho(k)}{\alpha_\rho(k)} \qquad \text{Eq. 9}$$

Recall that $\sigma_{ref}$, as used in Eq. 5, can be used by estimation module 430 to keep a volatility of the cost estimation at a predefined desired relative volatility. In various embodiments, a value can be set for $\sigma_{ref}$, and update the events per revenue forgetting factor ($\lambda_\rho$) based at least in part on the relative volatility reference parameter $\sigma_{ref}$ to keep the volatility of the cost estimation at the level associated with $\sigma_{ref}$. Generally, setting higher value for $\sigma_{ref}$ will introduce lower value for $\lambda_\rho$, thus causing the cost estimation to be more responsive to recently observed event volume and revenue. On the contrary, setting lower value for $\sigma_{ref}$ will introduce higher value for $\lambda_\rho$, thus causing the cost estimation to be less volatile or less susceptible to recently observed event volume and revenue.

In various embodiments, estimation module 430 may relate the estimator gain (i.e., the events per revenue forgetting factor $\lambda_\rho$) to the temporal volatility of the cost estimate. As used herein, temporal volatility can refer to the standard deviation of the cost estimate divided by the true cost over a period of time. In such embodiments, each set of values for estimated revenue rate, estimated events per revenue, and estimator gain correspond to a unique steady state relative volatility, or relative temporal volatility, of the cost estimate. As such, if reasonably good estimates (e.g., within a certain level of error) are made for estimated revenue rate and estimated events per revenue, there is a unique mapping between estimator gain and (steady-state) relative volatility of the cost estimate. In other words, each value of estimator gain corresponds to a unique value of (steady-state) relative volatility, or standard deviation, of the cost estimate. Generally, a desired relative volatility may be translated into a specific events per revenue forgetting factor ($\lambda_r$). Hence, the gain can be selected adaptively to ensure the relative volatility remains at a certain level, or remains no larger than at a certain level. The gain can be updated adaptively based on the estimated revenue rate ($\hat{v}(k)$) and the estimated events per revenue ($\hat{\rho}_{old}(k)$). As an example, if the estimated revenue rate and the estimated events per revenue are good estimates (e.g., within a certain margin of error) the estimator gain can be set to a specific value in order to obtain a relative temporal volatility equal to $\sigma_{ref}$.

In the meantime, estimation module 430 also maintains the $\lambda_\rho(k)$ between the minimum value ($\lambda_{\rho\_min}$) and the maximum value ($\lambda_{\rho\_max}$), (e.g., in accordance with Eq. 6). Therefore, estimation module 430 can adjust the aggressiveness (e.g., update $\lambda_\rho(k)$) based on the estimated revenue rate ($\hat{v}(k)$) and previous cost estimate ($\hat{c}(k-1)$) to trade volatility for response time. In particular, utilizing $\lambda_\rho(k)$, estimation module 430 may make the cost estimate ($\hat{c}(k)$) less volatile (at the expense of response time) and non-volatile cost estimates more responsive. In a particular embodiment, by setting $\lambda_{\rho\_min} = 0$ and $\lambda_{\rho\_max} = 1$, all cost estimates will have the same relative volatility at a steady state.

FIG. 5 depicts an illustrative process flow 500 for adaptively determining an estimate for an effective cost per event of interest or impression, in accordance with various embodiments of the present disclosure. Process 500 may be performed by processing logic that comprises hardware (e.g., circuitry, dedicated logic, programmable logic, microcode, etc.), software (e.g., instructions run on a processing device to perform hardware simulation), or any combination thereof and configured to provide cost estimates. As such, process 500 may be performed by a computing device, e.g., cost estimator 350 of FIG. 3A, cost estimator 400 of FIG. 4, and the like to implement one or more embodiments of the present disclosure. In various embodiments, process 500 can have fewer or additional operations, or perform some of the operations in different orders.

In various embodiments, the process begins at block 510, where a revenue rate estimate and a prior events per revenue estimate may be calculated, e.g., by estimation module 430 of FIG. 4. In one embodiment, the revenue rate estimate ($\hat{v}(k)$) for the present logical interval (e.g., state (k)) is calculated based at least in part on the observed revenue ($r(k)$) in a current logical interval. In such an embodiment, the prior events per revenue estimate ($\hat{\rho}_{old}(k)$) can be calculated based on values of state variables (e.g., $\alpha_\rho(k-1)$, $\beta_\rho(k-1)$) associated with the previous logical interval, e.g., according to Eq. 1, Eq. 2, Eq. 3, and Eq. 4 as discussed herein.

At block 520, an event per revenue forgetting factor (e.g., $\lambda_\rho$) may be generated, (e.g., by estimation module 430 of FIG. 4) based on the expected revenue rate estimation and the prior events per revenue estimate. The value of this events per revenue forgetting factor may be kept between 0 and 1. Thus, this events per revenue forgetting factor may be adaptively updated to discount the contribution of values of those relevant state variables associated with the previous logical interval when the events per revenue forgetting factor is updated, e.g., according Eq. 5 and Eq. 6 as discussed herein.

According to Eq. 5 and Eq. 6, the forgetting factor ($\lambda_\rho(k)$) is correlated with the revenue rate estimation ($\hat{v}(k)$) and the prior events per revenue rate estimation ($\hat{\rho}_{old}(k)$). As can be seen in Eq. 5 and Eq. 6, the forgetting factor ($\lambda_\rho(k)$) will increase in the current state compared to the previous state when the revenue rate estimation ($\hat{v}(k)$) or the prior events per revenue rate estimate ($\hat{\rho}_{old}(k)$) decreases from the previous state. Similarly, the forgetting factor ($\lambda_\rho(k)$) will decrease in the current state compared to the previous state when the revenue rate estimation ($\hat{v}(k)$) or the prior events per revenue rate estimate ($\hat{\rho}_{old}(k)$) increases from the previous state.

At block 530, the events per revenue state variables, e.g., $\alpha_\rho(k)$ and $\beta_\rho(k)$, may be recursively updated. In embodiments, a first events per revenue state variable, $\alpha_\rho(k)$, can be recursively updated based at least in part on the observed event volume observed in the current state ($n_E(k)$) and the events per revenue forgetting factor ($\lambda_\rho(k)$), e.g., based on Eq. 7. Similarly, a second events per revenue state variable, $\beta_\rho(k)$, may be updated based at least in part on the observed revenue observed in the current state ($r(k)$) and the events per revenue forgetting factor ($\lambda_\rho(k)$), e.g., based on Eq. 8.

At block 540, the present estimate for the eCPX for the current state (e.g., $\hat{c}(k)$) may be determined (e.g., by estimation module 430 of FIG. 4). In some embodiments, $\hat{c}(k)$ may be determined based at least in part on the observed event volume in the current state (e.g., $n_E(k)$), the observed revenue in the current state (e.g., $r(k)$), and the events per revenue forgetting factor ($\lambda_\rho(k)$) for the current state, e.g., based on Eq. 7, Eq. 8, and Eq. 9 as discussed herein.

In various embodiments, the events per revenue forgetting factor ($\lambda_\rho(k)$) may be updated based further on a volatility reference parameter, e.g., $\sigma_{ref}$, as used in Eq. 5. The volatility reference parameter may be set in a way to keep the volatility of the cost estimation at a prescribed volatility level.

FIG. 6 depicts an illustrative process flow for adjusting an events per revenue forgetting factor for cost estimation, in accordance with various embodiments of the present disclosure. Process 600 may be performed, for example, by cost estimator 400 to implement one or more embodiments of the present disclosure. In various embodiments, process 600 may be performed in reference to block 520 of FIG. 5. In various embodiments, various blocks in FIG. 6 may be combined or arranged in any suitable order, e.g., according to the particular embodiment of cost estimator 400 for generating cost estimates.

In various embodiments, the process may begin at block 610, where the events per revenue forgetting factor ($\lambda_\rho$) may be maintained between a minimum value ($\lambda_{\rho\_min}$) and a maximum value ($\lambda_{\rho\_max}$), e.g., by estimation module 430 of FIG. 4. The minimum value ($\lambda_{\rho\_min}$) and the maximum value ($\lambda_{\rho\_max}$) may be configurable parameters, e.g., set by estimation module 430 or a user. Generally, the minimum value ($\lambda_{\rho\_min}$) and the maximum value ($\lambda_{\rho\_max}$) may be set within the range of 0 and 1. Further, the events per revenue forgetting factor ($\lambda_\rho$) is restricted (e.g., in accordance with Eq. 6) from being adjusted to less than the minimum value ($\lambda_{\rho\_min}$) or greater than the maximum value ($\lambda_{\rho\_max}$).

Next, at block 620, where the events per revenue forgetting factor ($\lambda_\rho$) may be adjusted to reduce the volatility of the cost estimate (e.g., by estimation module 430 of FIG. 4). Estimation module 430 may set a volatility parameter (e.g., $\sigma_{ref}$) for the cost estimation, and update the events per revenue forgetting factor ($\lambda_\rho$) based at least in part on the volatility reference parameter ($\sigma_{ref}$) to control the volatility of the cost estimate, or keep the volatility of the cost estimate at a prescribed volatility level associated with $\sigma_{ref}$. As an example, in some embodiments, estimation module 430 may reduce $\sigma_{ref}$ to increase $\lambda_\rho$, thus reducing the volatility of the cost estimation. Further, as $\sigma_{ref}$ defines a certain level of volatility, an events per revenue forgetting factor ($\lambda_\rho$) determined based on a particular $\sigma_{ref}$ would also keep the cost estimate at a prescribed volatility level associated with this particular $\sigma_{ref}$. In other embodiments, $\sigma_{ref}$ can be a user defined parameter that enables a user to control the level of volatility of the cost estimate.

In some embodiments, the minimum value ($\lambda_{\rho\_min}$) and/or the maximum value ($\lambda_{\rho\_max}$) may be adjusted to potentially reduce the volatility of the cost estimate, e.g., reducing drastic change from the cost estimate for the current state from the prior cost estimate. As the values of the minimum value ($\lambda_{\rho\_min}$) or the maximum value ($\lambda_{\rho\_max}$) are increased, it would follow that the events per revenue forgetting factor ($\lambda_\rho$) may also be increased in some instances. Thus, the cost estimation may be less susceptible to recent observation of event rates or revenue.

Next, at block 630, where the events per revenue forgetting factor ($\lambda_\rho$) may be adjusted to increase the responsiveness of the cost estimation, e.g., by estimation module 430 of FIG. 4 or a user. On the contrary to block 620, estimation module 430 may increase $\sigma_{ref}$ to make $\lambda_\rho$ smaller, thus increasing the responsiveness of the cost estimation, especially for cases when the observed event rate is low. In such an embodiment, the minimum value ($\lambda_{\rho\_min}$) and/or the maximum value ($\lambda_{\rho\_max}$) may be decreased to potentially increase the responsiveness of the cost estimate for some cases. As mentioned previously, in a particular embodiment, $\sigma_{ref}$, $\lambda_{\rho\_min}$, and $\lambda_{\rho\_max}$ are user defined parameters that enable the user to control the level of volatility of the cost estimate.

Exemplary Computing Platform

Having described embodiments of the present invention, an example operating environment in which embodiments of the present invention may be implemented is described below in order to provide a general context for various aspects of the present invention. Referring to FIG. 7, an illustrative operating environment, or computing platform, for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more buses (such as an address bus, data bus, or combination thereof). Although depicted in FIG. 7, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 716 while also being one of the I/O components 720. As another example, processors have memory integrated therewith in the form of cache; however, there is no overlap between the one or more processors 714 and the memory 712. A person having ordinary skill in the art will readily recognize that such is the nature of the art, and it is reiterated that the diagram of FIG. 7 merely depicts an illustrative computing device that can be used in connection with one or more embodiments of the present invention. It should also be noticed that distinction is not made between such categories as "workstation," "server," "laptop," "hand-held device," etc., as all such devices are contemplated to be within the scope of computing device 700 of FIG. 7 and any other reference to "computing device," unless the context clearly indicates otherwise.

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media may include both volatile and/or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 700 includes one or more processors 714 that read data from various entities such as memory 712 or I/O components 720. Presentation component(s) 716 present data indications to a user or other device. Illustrative presentation components include a display device, speaker, printing component, vibrating component, etc.

Figure 8:
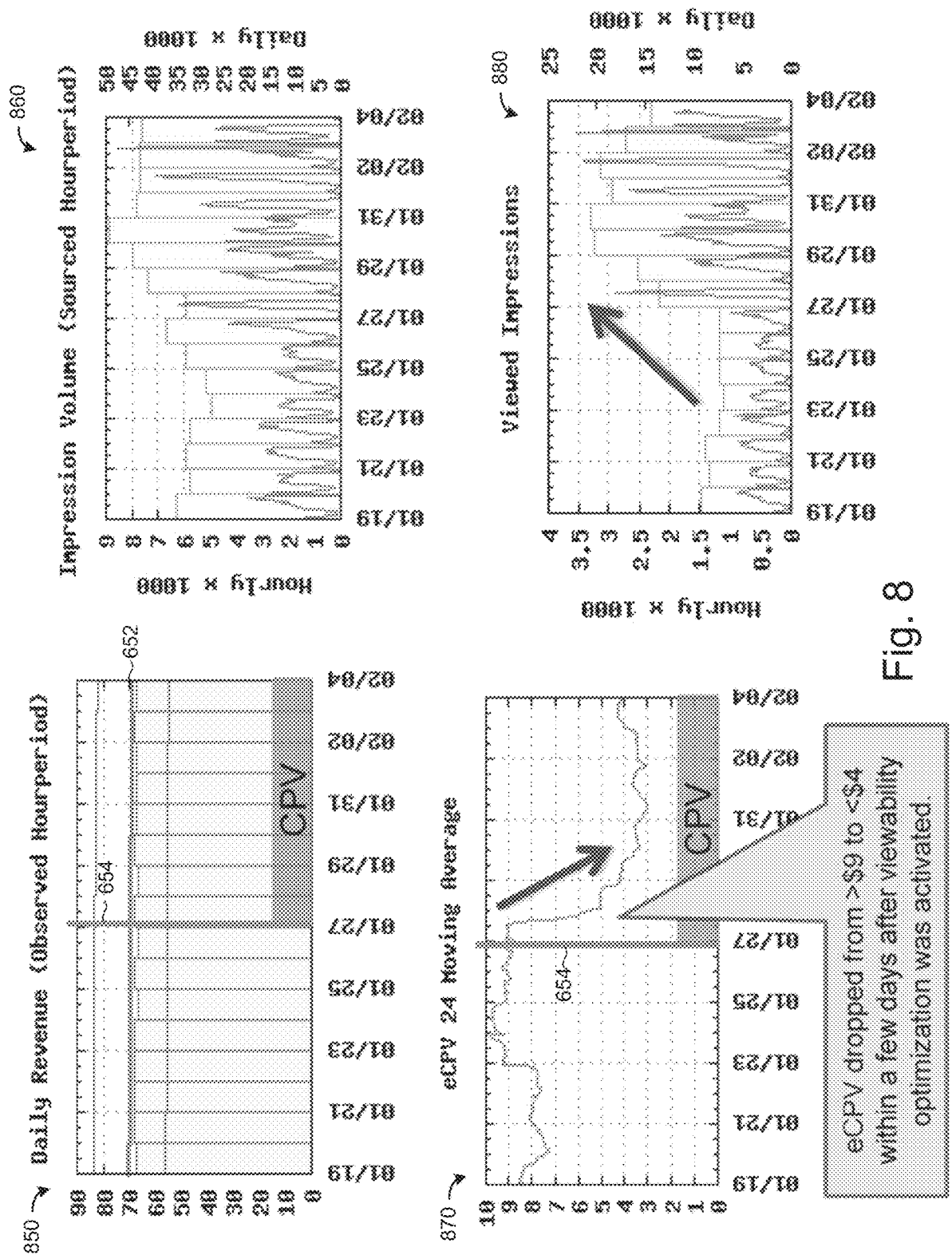
FIG. 8 illustrates graphical depictions of the minimization of the effective cost per thousand viewable impressions in an advertising campaign, in accordance with the various embodiments.

Exemplary Results for Minimizing the Effective Cost Per Thousand Viewable Events FIG. 8 illustrates graphical depictions of the minimization of the effective cost per thousand viewable impressions in an advertising campaign, in accordance with the various embodiments. In graphs 850, 860, 870, 880, a campaign control system, such as one of the various campaign control systems discussed herein, including but not limited to campaign control system 300 of FIG. 3A, was employed to minimize (or at least control) the effective cost per thousand viewable impressions (eCPV) within an exemplary, but non-limiting embodiment, of an advertising campaign. In the various embodiments, minimizing or at least controlling the eCPV may be referred to as optimizing the eCPV within a campaign.

Graph 850 shows the daily revenue (or pacing), in dollars, for the advertising campaign. The horizontal bar 652 represents the desired pacing or revenue. The advertising campaign has set the desired revenue to be $70. As shown in graph 850, the various embodiments control the advertising campaign, such that the daily revenue is approximately equivalent to the desired revenue. The vertical bar 654 (at the beginning of January 27) shows the time or temporal slice where the system's eCPV optimization was activated. In various embodiments, eCPV optimization includes minimizing (or at least controlling) the effective cost per viewable impression.

Graph 860 shows that distribution of impressions provided during each day of the advertising campaign. The bar charts and the y-axis on the right side of graph 860 show the daily volume of provided impressions. The continuous plot and the y-axis on the left side of graph 860 show the hourly volume of provided impressions for each day of the campaign. Note that shortly after the viewability optimization was activated (at the beginning of January 27), the campaign experiences an uptick in the daily volume of provided impressions.

Graph 870 shows the 24 hour moving average of the eCPV. As shown via the downward trending arrow, shortly after the viewability optimization was activated (at the beginning of January 27), the eCPV decreases from greater than $9 to less than $4. During the campaign, the maximum cost was set to $9.20. Note that the eCPV does not exceed the maximum cost at any point after the activation of eCPV optimization, i.e., following January 27.

Graph 880 shows the distribution of viewable impressions provided during each day of the advertising campaign. The bar chart and the y-axis on the right side of graph 860 show the daily volume of viewable impressions. The continuous plot and the y-axis on the left side of graph 860 show the hourly volume of viewable impressions for each day of the campaign. Because the daily revenue has stayed approximately constant throughout the campaign, but the eCPV has dropped after the eCPV optimization was activated (at the beginning of January 27), as shown by the upward trending arrow, the campaign experiences an uptick in the daily volume of viewable impressions. Accordingly, the campaign control system has optimized or at least increased the viewable impression volume.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternative embodiments may be practiced with only some of the described aspects. For purposes of explanation, specific numbers, materials, and configurations are set forth in order to provide a thorough understanding of the illustrative embodiments. However, it will be apparent to one skilled in the art that alternative embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method of controlling an advertising campaign comprising:
   receiving a pacing indicator that indicates a pacing associated with a user for a current portion of the advertising campaign;
   monitoring, by a processor, bid transactions of an advertising market associated with the advertising campaign to determine an observed pacing measurement from the bid transactions;
   determining, by the processor, a pacing error based on a difference between the pacing indicated by the pacing indicator and the observed pacing measurement;
   receiving a maximum cost indicator that indicates a maximum cost per event or impression associated with the user for the current portion of the advertising campaign;
   monitoring, by the processor, one or more bid transactions of the advertising market associated with the advertising campaign to determine an observed cost measurement from the one or more bid transactions;
   determining, by the processor, a cost error based on a difference between the maximum cost indicated by the maximum cost indicator and the observed cost measurement;
   determining, by the processor, a first revenue state variable, $\alpha_r(k)$, at a current state, k, based on:

$$\lambda_r^h \alpha_r(k-1) + r(k),$$

wherein:
   $\lambda_r^h$ represents a revenue forgetting factor;
   $\alpha_r(k-1)$ represents the first revenue state variable at a previous state, k−1; and
   r(k) represents an observed revenue in the current state;
   determining, by the processor, one or more control signals, comprising at least one of a price control signal or an allocation control signal, based on the first revenue state variable and a function of the pacing error and the cost error; and
   adjusting, by the processor, at least one of a bid price or a bid allocation for the advertising campaign based on the one or more control signals comprising at least one of the price control signal or the allocation control signal.

2. The method of claim 1, comprising:
   prior to the monitoring bid transactions, determining a period of time associated with determining the observed pacing measurement based on one or more campaign characteristics of the advertising campaign, wherein the observed pacing measurement is calculated over the period of time.

3. The method of claim 1, comprising:
   prior to the monitoring one or more bid transactions, determining a period of time associated with determining the observed cost measurement based on one or more campaign characteristics of the advertising campaign, wherein the observed cost measurement is calculated over the period of time.

4. The method of claim 1, wherein the one or more control signals comprises the price control signal, wherein the price control signal adjusts the bid price.

5. The method of claim 1, wherein the determination of the one or more control signals is accomplished via an adaptive control scheme.

6. The method of claim 1, wherein the one or more control signals comprises the allocation control signal, wherein the allocation control signal adjusts the bid allocation.

7. The method of claim 1, wherein the observed cost measurement represents an effective cost per event or impression.

8. The method of claim 7, wherein an event type associated with the effective cost per event comprises at least one of a viewable impression, click event, or a conversion event.

9. The method of claim 1, wherein adjusting at least one of the bid price or the bid allocation based on the one or more control signals decreases the observed cost measurement.

10. One or more non-transitory computer-readable media having instructions stored thereon, wherein the instructions, when executed by a processor of a computing device, cause the computing device to:
- receive a maximum cost indicator that indicates a maximum cost per event or impression associated with a user for a current portion of an advertising campaign;
- receive a pacing indicator that indicates a pacing associated with the user for the current portion of the advertising campaign;
- monitor, by the processor, bid transactions of an advertising market associated with the advertising campaign to determine an observed cost measurement from the bid transactions;
- monitor, by the processor, one or more bid transactions of the advertising market associated with the advertising campaign to determine an observed pacing measurement from the one or more bid transactions;
- determine, by the processor, a pacing error based on a difference between the pacing indicated by the pacing indicator and the observed pacing measurement;
- determine, by the processor, a cost error based on a difference between the maximum cost indicated by the maximum cost indicator and the observed cost measurement;
- determine, by the processor, a first revenue state variable at a current state, k, based on the equation:

$$\alpha_r(k)=\lambda_r^h \alpha_r(k-1)+r(k),$$

wherein:
- $\alpha_r(k)$ represents the first revenue state variable at the current state k;
- $\lambda_r^h$ represents a revenue forgetting factor;
- $\alpha_r(k-1)$ represents the first revenue state variable at a previous state, k−1; and
- $r(k)$ represents an observed revenue in the current state;
- determine, by the processor, one or more control signals based on the first revenue state variable and a function of the pacing error and the cost error; and
- adjust, by the processor, at least one of a bid price or a bid allocation for the advertising campaign based on the one or more control signals.

11. The one or more non-transitory computer-readable media of claim 10, wherein the instructions cause the computing device to:
- prior to the monitoring bid transactions, determining a first period of time associated with determining the observed pacing measurement based on one or more campaign characteristics of the advertising campaign, wherein the observed pacing measurement is calculated over the first period of time; and
- prior to the monitoring one or more bid transactions, determining a second period of time associated with determining the observed cost measurement based on one or more campaign characteristics of the advertising campaign, wherein the observed cost measurement is calculated over the second period of time.

12. The one or more non-transitory computer-readable media of claim 10, wherein the determination of the one or more control signals is accomplished via an adaptive control scheme.

13. The one or more non-transitory computer-readable media of claim 10, wherein the one or more control signals comprises a price control signal, wherein the price control signal adjusts the bid price.

14. The one or more non-transitory computer-readable media of claim 10, wherein the one or more control signals comprises an allocation control signal, wherein the allocation control signal adjusts the bid allocation.

15. The one or more non-transitory computer-readable media of claim 10, wherein the observed cost measurement represents an effective cost per event or impression.

16. The one or more non-transitory computer-readable media of claim 15, wherein an event type associated with the effective cost per event comprises at least one of a viewable impression, click event, or a conversion event.

17. The one or more non-transitory computer-readable media of claim 10, wherein adjusting at least one of the bid price or the bid allocation based on the one or more control signals decreases the observed cost measurement.

18. A system for controlling an advertising campaign comprising:
- a processor; and
- memory comprising processor-executable instructions that when executed by the processor implement:
  - a cost estimator that:
    - monitors bid transactions of an advertising market associated with the advertising campaign; and
    - generates an observed cost signal based on the bid transactions;
  - a controller that:
    - receives the observed cost signal, an observed pacing signal, and a pacing signal that indicates a pacing associated with a user for a current portion of the advertising campaign;
    - determines a pacing error based on a difference between the pacing indicated by the pacing signal and the observed pacing signal;
    - receives a maximum cost indicator that indicates a maximum cost per event or impression associated with the user for the current portion of the advertising campaign;
    - monitors one or more bid transactions of the advertising market associated with the advertising campaign to determine an observed cost measurement from the one or more bid transactions;
    - determines a cost error based on a difference between the maximum cost indicated by the maximum cost indicator and the observed cost measurement;
    - determines a first revenue state variable, $\alpha_r(k)$, at a current state, k, based on:

$$\lambda_r^h \alpha_r(k-1)+r(k),$$

wherein:
    - $\lambda_r^h$ represents a revenue forgetting factor;
    - $\alpha_r(k-1)$ represents a revenue state variable at a previous state; and
    - $r(k)$ represents an observed revenue in the current state; and
    - determines one or more control signals based on the first revenue state variable and a function of the pacing error and the cost error; and
  - an actuator that:
    - adjusts at least one of a bid price or a bid allocation for the advertising campaign based on the one or more control signals.

19. The system of claim 18, comprising:
a component that:
  prior to the monitoring one or more bid transactions, determines a period of time associated with determining the observed cost measurement based on one or more campaign characteristics of the advertising campaign, wherein the observed cost measurement is calculated over the period of time.

20. The system of claim 18, wherein the controller utilizes an adaptive control scheme to generate the one or more control signals.

21. The system of claim 18, wherein the one or more control signals comprises a price control signal, wherein the price control signal adjusts the bid price.

22. The system of claim 18, wherein the one or more control signals comprises an allocation control signal, wherein the allocation control signal adjusts the bid allocation.

23. The system of claim 18, wherein the observed cost measurement represents an effective cost per event or impression.

24. The system of claim 23, wherein an event type associated with the effective cost per event comprises at least one of a viewable impression, click event, or a conversion event.

25. The system of claim 18, wherein adjusting at least one of the bid price or the bid allocation based on the one or more control signals decreases the observed cost signal.

26. The system of claim 18, wherein the pacing signal is represented in monetary units.

27. The system of claim 18, wherein the pacing signal is represented as a number of events.

28. The system of claim 18, wherein the observed cost signal is an adaptive cost estimate.

* * * * *